US 6,617,008 B1

United States Patent
Kono et al.

(10) Patent No.: US 6,617,008 B1
(45) Date of Patent: *Sep. 9, 2003

(54) DECORATIVE FILM OR SHEET, AND DECORATIVE MATERIAL AND BUILDING MATERIAL MADE BY USING THE SAME

(75) Inventors: Takayuki Kono, Ichihara (JP); Toshimi Nikaido, Ichihara (JP); Masahiko Endo, Ichihara (JP)

(73) Assignee: Idemitsu Petrochemical Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/125,112

(22) PCT Filed: Feb. 21, 1997

(86) PCT No.: PCT/JP97/00486

§ 371 (c)(1),
(2), (4) Date: Aug. 18, 1998

(87) PCT Pub. No.: WO97/30848

PCT Pub. Date: Aug. 28, 1997

(30) Foreign Application Priority Data

Feb. 22, 1996 (JP) ................................. 8-034517
Feb. 22, 1996 (JP) ................................. 8-035017

(51) Int. Cl.$^7$ ............................ B32B 27/00; B32B 3/00
(52) U.S. Cl. ..................... 428/195; 428/201; 428/203; 428/323; 428/327; 428/411.1; 428/461; 428/500; 428/515; 428/516; 428/542.2; 428/908.8
(58) Field of Search ................. 428/195, 201, 428/203, 323, 327, 411.1, 461, 500, 515, 542.2, 908.8, 516

(56) References Cited

U.S. PATENT DOCUMENTS

| | | | | |
|---|---|---|---|---|
| 4,215,168 A | * | 7/1980 | Yonemura et al. | 428/215 |
| 4,343,851 A | * | 8/1982 | Sheptak | 428/212 |
| 4,751,121 A | * | 6/1988 | Kuhnel et al. | 428/40 |
| 5,316,861 A | * | 5/1994 | Marshal et al. | 428/516 |
| 5,439,725 A | * | 8/1995 | Roberts | 428/95 |
| 5,458,953 A | * | 10/1995 | Wang et al. | 428/195 |
| 5,468,532 A | * | 11/1995 | Ho et al. | 428/40 |
| 5,476,914 A | | 12/1995 | Ewen et al. | 526/351 |
| 5,525,675 A | * | 6/1996 | Masuda et al. | 525/194 |
| 5,955,524 A | * | 9/1999 | Azuma et al. | 524/178 |
| 6,001,933 A | * | 12/1999 | Tsuruoka et al. | 525/232 |
| 6,096,814 A | * | 8/2000 | Tamura et al. | 428/343 |

FOREIGN PATENT DOCUMENTS

| | | | |
|---|---|---|---|
| EP | 000114391 A1 | * | 8/1984 |
| EP | 0 455 813 | | 11/1991 |
| EP | 0 455 813 A1 | * | 11/1991 |
| EP | 0 744 439 | | 11/1996 |
| JP | 89-122506 | | 7/1984 |
| JP | 6-198831 | | 7/1994 |
| JP | 8-1881 | | 1/1996 |
| JP | 08073529 A | * | 3/1996 |
| JP | 408319382 A | * | 12/1996 |

OTHER PUBLICATIONS

Patent Abstracts of Japan, vol. 15, No. 409, Oct. 18, 1991.

* cited by examiner

*Primary Examiner*—Paul Thibodeau
*Assistant Examiner*—Monique R. Jackson
(74) *Attorney, Agent, or Firm*—Oblon, Spivak, McClelland, Maier & Neustadt, P.C.

(57) ABSTRACT

A decorative film or sheet having a laminate structure comprising a surface layer, an adhesive layer, and a layer having a pattern or a laminate structure comprising a surface layer, an adhesive layer, a layer having a pattern, an adhesive layer, and a substrate, wherein the surface layer is made of a film of a sheet comprising a resin which comprises (A) 100 to 60% by weight of a substantial homopolymer of polypropylene having a pentad fraction, a peak temperature of melting, and an enthalpy of melting each in a specific range and (B) 0 to 40% by weight of a thermoplastic elastomer copolymer and a decorative building material having a surface layer made of a film or a sheet comprising the above resin. In accordance with the present invention, a laminated decorative film or sheet which comprises a surface layer having excellent transparency and hardness, has excellent workability in bending, V-cutting, lapping, and vacuum molding, and does not cause problems in disposal and a decorative building material which has excellent heat resistance, weatherability, and abrasion resistance, provides soft feeling, and does not cause problems in the environment can be obtained easily.

26 Claims, No Drawings

DECORATIVE FILM OR SHEET, AND DECORATIVE MATERIAL AND BUILDING MATERIAL MADE BY USING THE SAME

TECHNICAL FIELD

The present invention relates to a decorative film or sheet, a decorative material comprising the same, and a decorative building material comprising the same. More particularly, the present invention relates to a laminated decorative film or sheet which comprises a surface layer having excellent transparency and hardness, has excellent workability in bending, V-cutting, lapping, and vacuum molding, and does not cause problems in disposal because chlorine gas is not formed by incineration, a decorative material comprising this decorative film or sheet, and a decorative building material which has excellent heat resistance, weatherability, and abrasion resistance, provides soft feeling, and does not cause problems in the environment.

BACKGROUND ART

Heretofore, as decorative face, plates of furniture's and cabinets of kitchen products, materials having a structure in which a decorative film or sheet having print of a wood pattern is laminated to a substrate made of a wood material with an adihesive have generally been used.

Decorative films and sheets used for such decorative face plates are generally required to have (1) workability in lapping and vacuum molding, i.e., workability which enables fitting a film or a sheet to a shape of a substrate in lamination when the substrate has an irregular shape or a complicated shape and (2) workability in V-cutting, i.e., workability in a process comprising forming cuts of a V-shape on decorative face plates after the plates have been assembled so that formation of boxes or folding of end parts can be facilitated. More specifically, it is required that troubles, such as formation of cracks, cuts, and whitening, are not caused at folded parts of decorative films or sheets.

To provide decorative films and sheets with the workability in V-cutting and lapping, films or sheets made of vinyl chloride resins have heretofore been used. However, Vinyl chloride resins have inferior weatherability and resistance to stains and require a large thickness to have a sufficient strength necessary for V-cutting. Moreover, disposal of vinyl chloride resins causes a problem in that toxic chlorine gas and dioxine are formed when the resins are incinerated. Although various proposals have been made to solve these problems, no proposals are found to be satisfactory.

For example, a thermoplastic resin is used in place of a vinyl chloride resin in the specification of Japanese Patent Application Laid-Open No. Heisei 3(1991)-202347. In this case, a problem arises in that a double structure is necessary to obtain a necessary strength, and the number of steps in the production process is increased. An acrylic resin is used in the specification of Japanese Patent Application Laid-Open No. Heisei 6(1994)-262729. The acrylic resin easily absorbs water, and there is the possibility that warpage is formed in the product because of the difference in dimensional stability. A thermosetting resin is used in the specification of Japanese Patent Application Laid-Open No. Heisei 7(1995)-244684. This resin has a drawback in that handling during the production is difficult. A polypropylene resin or a polyethylene resin is used in the specifications of Japanese Patent Application Laid-Open No. Heisei 7(1995)-17005, Japanese Patent Application Laid-Open No. Heisei 7(1995)-24979, Japanese Patent Appl ication Laid-Open No. Heisei 7(1995)-137205, and Japanese Patent Application Laid-Open No. Heisei 7(1995)-232415. These resins do not have a sufficient flexibility.

On the other hand, for building materials, wood and vinyl chloride resins are mainly used. However, use of wood has a restriction because forests must be protected. Vinyl chloride resins have following drawbacks: (1) use of vinyl chloride resins causes problems because toxic chlorine and dioxine are formed during working and incineration although the resins show excellent workability; (2) although flexibility of vinyl chloride resins can be controlled in a wide range by using plasticizers, plasticizers tend to bleed in molded products to cause inferior appearance; (3) floor materials made of vinyl chloride resins cannot satisfy requirements as replacements of wood because the resins have characteristic feel of synthetic plastics in that the materials are felt cold and rigid; and (4) vinyl chloride resins show inferior heat resistance, weatherability, and abrasion resistance.

The drawback described in (1) is particularly important for vinyl chloride resins from the standpoint of protection of the environment as described above for the decorative films and sheets. Therefore, vinyl chloride resins are not materials suited for the global movement which requires materials causing no problem in the environment. Development of materials which can replace vinyl chloride resins are urgently desired.

DISCLOSURE OF THE INVENTION

Under the above circumstances, the object of the present invention is to provide a decorative film or sheet which has excellent workability in bending, V-cutting, lapping, and vacuum molding, comprises a surface layer having excellent transparency and hardness, and does not cause problems in disposal so that chlorine gas is not formed by incineration, a decorative material comprising this film or sheet, and a decorative building material which shows excellent heat resistance, weatherability, and abrasion resistance, has excellent property for printing and workability in fabrication, provide,s soft feeling, and does not cause problems in the environment.

As the result of extensive studies by the present inventors to achieve the above object, it was found that the object can be achieved by using a film or a sheet having a laminate structure comprising a surface layer, an adhesive layer, and a layer having a pattern or a laminate structure comprising a surface layer, an adhesive layer, a layer having a pattern, an adhesive layer, and a substrate, wherein the surface layer comprises a resin mixture which comprises a specific polypropylene resin or a combination of a specific polypropylene resin and a thermoplastic elastomer copolymer in specific relative amounts. The present invention has been completed on the basis of this knowledge.

Accordingly, the present invention provides:

(1) A decorative film or sheet having a laminate structure comprising a surface layer, an adhesive layer, and a layer having a pattern, wherein the surface layer is made of a film or a sheet comprising a resin which comprises (A) 100 to 60% by weight of a polypropylene resin comprising one or both of a homopolymer of propylene and a copolymer of propylene containing 4% by weight or less of units of other olefins, the homopolymer and the copolymer having (i) a pentad fraction expressed by rrrr/(1−mmmm)×100 of 15 to 60% as measured by a nuclear magnetic resonance spectrum of an isotopic carbon ($^{13}$C-NMR), (ii) a peak temperature of melting (Tm) of 150° C.

or higher as measured by a differential scanning calorimeter (DSC), and (iii) an enthalpy of melting (ΔH) of 100 J/g or less as measured by DSC, and (B) 0 to 40% by weight of a thermoplastic elastomer copolymer;

(2) A decorative film or sheet having a laminate structure comprising a surface layer, an adhesive layer, a layer having a pattern, an adhesive layer, and a substrate, wherein the surface layer or the surface layer and the substrate are made of a film or a sheet comprising a resin which comprises (A) 100 to 60% by weight of a polypropylene resin comprising one or both of a homopolymer of propylene and a copolymer of propylene containing 4% by weight or less of units of other olefins, the homopolymer and the copolymer having (i) a pentad fraction expressed by rrrr/(1−mmmm)×100 of 15 to 60% as measured by a nuclear magnetic resonance spectrum of an isotopic carton ($^{13}$C-NMR), (ii) a peak temperature of melting (Tm) of 150° C. or higher as measured by a differential scanning calorimeter (DSC), and (iii) an enthalpy of melting (ΔH) of 100 J/g or less as measured by DSC, and (B) 0 to 40% by weight of a thermoplastic elastomer copolymer;

(3) A decorative material comprising the decorative film or sheet described in (1) which is bonded to a substrate selected from wood substrates, metal substrates, inorganic substrates, and resin substrates;

(4) A decorative material comprising the decorative film or sheet described in (2) which is bonded to a substrate selected from wood substrates, metal substrates, inorganic substrates, and resin substrates; and (5) A decorative building material having a surface layer comprising a resin which comprises (A) 100 to 60% by weight of a polypropylene resin comprising one or both of a homopolymer of propylene and a copolymer of propylene containing 4% by weight or less of units of other olefins, the homopolymer and the copolymer having (i) a pentad fraction expressed by rrrr/(1−mmmm)×100 of 15 to 60% as measured by a nuclear magnetic resonance spectrum of an isotopic carbon ($^{13}$C-NMR), (ii) a peak temperature of melting (Tm) of 150° C. or higher as measured by a differential scanning calorimeter (DSC), and (iii) an enthalpy of melting (ΔH) of 100 J/g or less as measured by DSC, and (B) 0 to 40% by weight of a thermoplastic elastomer copolymer.

THE MOST PREFERRED EMBODIMENT TO CARRY OUT THE INVENTION

The decorative film or sheet of the present invention has a laminate structure comprising a surface layer, an adhesive layer, and a layer having a pattern or a laminate structure comprising a surface layer, an adhesive layer, a layer having a pattern, an adhesive layer, and a substrate. In the present invention, a film or a sheet comprising a polypropylene resin of component (A) which comprises one or both of a homopolymer of propylene and a copolymer of propylene containing 4% by weight or less of units of other olefins and has specific structures and properties described below or a resin mixture containing component (A) and a thermoplastic elastomer copolymer of component (B) is used as a surface layer or a surface layer and a substrate comprised in the decorative film or sheet.

The specific structures and properties of the homopolymer and the copolymer of propylene described above are described in the following in [i] to [iii].

(i) Firstly, it is necessary that the pentad fraction expressed by rrrr/(1−mmmm)×100 be in the range of 15 to 60% as measured by a nuclear magnetic resonance spectrum of an isotopic carbon ($^{13}$C-NMR). When this value is less than 15%, heat resistance is insufficient. When this value exceeds 60%, flexibility is insufficient, and workability in V-cutting and lapping becomes inferior. The value of rrrr/(1−mmmm)×100 is preferably in the range of 15 to 50%, more preferably in the range of 20 to 40%, from the standpoint of the balance between heat resistance and flexibility. In this description, rrrr means a configuration in which five methyl groups attached to a main chain formed by carbon-carbon bonds of arbitrarily selected five successive propylene units are disposed at alternately opposite relative positions or a fraction of this configuration, and mmmm means a configuration in which five methyl groups attached to a main chain formed by carbon-carbon bonds are arbitrarily selected five successive propylene units are disposed at the same relative positions or a fraction of this configuration.

The value of rrrr/(1−mmmm) is measured in accordance with the following method. Measurement of 13C-NMR is conducted using JNM-FX-200 (manufactured by NIPPON DENSHI Co., Ltd.; resonance frequency of the $^{13}$C nucleus, 50.1 MHz) at the following mode of measurement: complete decoupling of proton; pulse width, 6.9 μs (45°); repeating time of pulse, 3 s; number of accumulation, 10,000; solvent, 1,2,4-trichlorobenzene/heavy benzene (90/10% by volume); concentration of sample, 250 mg/2.5 ml of solvent; and temperature of the measurement, 130° C. The fractions of pentads are measured using difference in the chemical shift depending on the stereoregularity of methyl group. Specifically, the pentad fractions are obtained from ratios of intensities by area between the following peaks of mmmm to mrrm which are observed in the region of 22.5 to 19.5 ppm, and the value of rrrr/(1−mmmm)×100 was obtained from these pentad fractions.

| | |
|---|---|
| mmmm: | 21.86 ppm |
| mmmr: | 21.62 ppm |
| mmrr: | 21.08 ppm |
| mmrm + rrmr: | 20.89 ppm |
| rrrr: | 20.36 ppm |
| mrrm: | 19.97 ppm |

[ii] Secondly, it is necessary that the peak temperature of melting (Tm) be 150° C. or higher as measured by a differential scanning calorimeter (DSC). When Tm is lower than 150° C., sufficient heat resistance cannot be obtained.

Tm is generally in the range of 150 to 165° C. Measurement of Tm is conducted using DSC-7 manufactured by PERKIN-ELMER Company, and the value of Tm is obtained as lthe peak temperature of melting in accordance with the method of Japanese Industrial Standard K-7121.

[iii] Thirdly, it is necessary that the enthalpy of melting (ΔH) be 100 J/g or less as measured by DSC. When ΔH exceeds 100 J/g, flexibility deteriorates, and workability in V-cutting and lapping becomes inferior. ΔH is preferably in the range of 10 to 100 J/g because strength is insufficient when ΔH is excessively small. Measurement of ΔH is conducted using DSC-7 manufactured by PERKIN-ELMER Company, and ΔH is obtained as the total heat energy absorbed during melting of crystals in accordance with the method of Japanese Industrial Standard K-7122. The measurement using DSC is conducted at the following measurement mode: sample is held at 230° C. for 3 minutes; then, temperature is decreased to 50° C. at a speed of 10° C./minute; sample is held at 50° C. for 3 minutes; and then, temperature is increased to 230° C. at a speed of 10° C./minute.

It is preferable that the above homopolymer of propylene and the copolymer of propylene containing 4% by weight or less of units of other olefins contain a fraction soluble in boiling n-heptane in the range of 7 to 50% by weight. When the content of the fraction soluble in boiling n-heptane is less than 7% by weight, flexibility is insufficient, and there is the possibility that workability in V-cutting and lapping becomes inferior. When the content of the fraction soluble in boiling n-heptane exceeds 50% by weight, sufficient mechanical strengths and heat resistance cannot be obtained. The content of the fraction soluble in boiling n-heptane is more preferably in the range of 10 to 40% by weight from the standpoint of the balance between flexibility, mechanical strengths, and heat resistance. The content of the fraction soluble in boiling n-heptane is obtained by extraction of a sample with boiling n-heptane for 6 hours using a Soxhlet extractor and then calculating the dissolved amount from the extracted amount.

On the other hand, in the decorative building material of the present invention, a polypropylene resin of component (A') comprising one or both of a homopolymer of propylene and a copolymer of propylene containing 4% by weight or less of units of other olefins and having specific structures and properties described below or a resin mixture containing component (A') and a thermoplastic elastomer copolymer of component (B) is used as a surface layer.

The specific structures and properties of the homopolymer and the copolymer of propylene described above are described in the following in [i] to [iii].

(i) Firstly, the pentad fraction expressed by rrrr/1−mmmm)×100 is in the range of 15 to 60% as measured by a nuclear magnetic resonance spectrum of an isotopic carbon ($^{13}$C-NMR). When this value is less than 15%, heat resistance is insufficient. When this value exceeds 60%, flexibility is insufficient. The value of rrrr/1−mmmm×100 is preferably in the range of 20 to 60%, more preferably in the range of 25 to 55%, from the standpoint of the balance between heat resistance and flexibility.

[ii] Secondly, the peak temperature of melting (Tm) is 150° C. or higher as measured by a differential scanning calorimeter (DSC). When Tm is lower than 150° C., sufficient heat resistance cannot be obtained. Tm is generally in the range of 150 to 165° C.

[iii] Thirdly, the enthalpy of melting (ΔH) is 100 J/g or less as measured by DSC. When ΔH exceeds 100 J/g, flexibility deteriorates, and the object of the present invention cannot be achieved. ΔH is preferably in the range of 10 to 100 J/g, more preferably in the range of 20 to 100 J/g, most preferably 40 to 90 J/g, because strength is insufficient when ΔH is excessively small.

The homopolymer of propylene and the copolymer of propylene containing 4% by weight or less of units of other olefins preferably have a fraction soluble in boiling n-heptane in the range of 7 to 50% by weight. When the content of the fraction soluble in boiling n-heptane is less than 7% by weight, there is the possibility that flexibility is inferior. When the content of the fraction soluble in boiling n-heptane exceeds 50% by weight, there is the tendency that sufficient mechanical strengths and heat resistance cannot be obtained. The content of the fraction soluble in boiling n-heptane is more preferably in the range of 10 to 40% by weight from the standpoint of the balance between flexibility, mechanical strengths, and heat resistance.

The methods of measurement of the fraction of pentad, the peak temperature of melting (Tm), the enthalpy of melting (ΔH), and the fraction soluble in boiling n-heptane in component (A') are the same as the methods used for measurement of the corresponding properties of component (A) in the above decorative film or sheet.

In the homopolymer of propylene and the copolymer containing 4% by weight or less of units of other olefins in component (A) and component (A') described above, it does not generally occur in the sequence of the units of propylene that carbon atoms having methyl group as the side group are placed next to each other and bonded directly to each other. In other words, reversed bonding of monomer units does not occur, and carbon atoms having methyl group as the side group are regularly arranged with another carbon atom between them. In still other words, in the present invention, units of propylene are bonded to each other in the heat-to-tail bonding, and the head-to-head bonding and the tail-to-tail bonding are substantially absent.

Examples of the olefins as the comonomer forming the units of other olefins in the copolymer of propylene containing 4% by weight or less of units of other olefins include α-olefins, such as ethylene, butene-1, pentene-1, 4-methyl-1-pentene, hexene-1, heptene-1, octene-1, nonene-1, and decene-1. Among these olefins, ethylene is preferable. The olefin can be used singly or as a combination of two or more types. It is necessary that the olefin used as the comonomer be used in such an amount that the content of the unit derived from the olefin in the copolymer of propylene is 4% by weight or less.

In the present invention, the polypropylene resin used as component (A) or component (A') preferably has a melt index (MI) in the range of 0.1 to 50 g/10 minutes. When MI is less than 0.1 g/10 minutes, molding becomes difficult. When MI exceeds 50 g/10 minutes, mechanical properties of the obtained films, sheets, and molded products are insufficient. From the standpoint of the balance between moldability and mechanical properties of obtained films, sheets, and molded products, MI is more preferably in the range of 0.2 to 30 g/10 minutes. MI is the value obtained in accordance with the method of Japanese Industrial Standard K7210 at a load of 2.16 kgf and a temperature of 230° C.

The polypropylene resin used as component (A) and component (A') in the present invention can be produced, for example, in accordance with the single step gas phase polymerization process, the single step slurry polymerization process, the multi-step gas phase polymerization process, the multi-step slurry polymerization process, or the blending process. For example, when the polypropylene resin is produced in accordance with one of the above polymerization processes, propylene can be homopolymerized or copolymerized with other olefins in the presence of a catalyst system comprising:

(a) a solid component constituted with (i) a solid catalyst component comprising magnesium, titanium, a halogen atom, and an electron donor and, optionally, (ii) a crystalline polyolefin;

(b) an organoaluminum compound;

(c) an aromatic compound containing alkoxy groups which is represented by general formula (I):

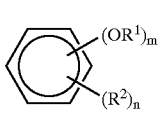

(I)

wherein $R^1$ represents an alkyl group having 1 to 20 carbon atoms, $R^2$ represents a hydrocarbon group having 1 to 10 carbon atoms, hydroxyl group, or nitro group, m represents an integer of 1 to 6, and n represents an integer of 0 to (6-m); and optionally, (d) an electron donating compound.

The above solid component of component (a) is constituted with a solid catalyst component comprising magnesium, titanium, a halogen atom, and an electron donor of component (i) and, optionally, a crystalline polyolefin of component (ii). The solid catalyst component of component (i) contains magnesium titanium, a halogen atom, and an electron donor as the essential components and can be prepared by bringing a magnesium compound and a titanium compound into contact with an electron donor. The halogen atom is contained in the magnesium compound or the titanium compound in the form of a halide.

Examples of the magnesium compound include magnesium dihalides, such as magnesium dichloride; magnesium oxide; magnesium hydroxide; hydrotalcite; magnesium salts of carboxylic acids; dialkoxymagnesiums, such as dialkoxymagnesium; diaryloxymagnesiums; alkoxymagnesium halides; aryloxymagnesium halides; dialkylmagnesiums, such as ethylbutylmagnesium; and reaction products of organomagnesium compounds with electron donors, halosilanes, alkoxysilanes, silanols, and aluminum compounds. Among these compounds, magnesium dihalides, dialkoxymagnesiums, and alkylmagnesium halides are preferable. The magnesium compound can be used singly or as a combination of two or more types.

Reaction products of magnesium metal and a halogen and reaction products of magnesium metal, compounds containing a halogen, and alcohols can also be used as the magnesium compound. The magnesium metal is not particularly limited, and magnesium metal having any grain size, such as magnesium metal in the form of granules, ribbons, and powder, may be used. The surface condition of magnesium metal is not particularly limited, either. However, it is preferable that magnesium metal is not coated with a film, such as a film of magnesium oxide.

As the alcohol, any alcohol may be used. Lower alcohols having 1 to 6 carbon atoms are preferable, and ethanol is more preferable because a solid catalyst component providing remarkably enhanced performances to the catalyst can be obtained. The purity of the alcohol or the content of water in the alcohol are not particularly limited. However, it is preferable that an alcohol containing water in an amount of 1% by weight or less, more preferably 2,000 ppm or less, is used because magnesium hydroxide is formed on the surface of magnesium metal when an alcohol containing a large amount of water is used. The smaller the content of water, the more advantageous the alcohol.

The type of the halogen or the compound containing a halogen is not particularly limited. Any compound containing a halogen atom in the molecule can be used as the compound containing a halogen. In such a compound, the type of the halogen atom is not particularly limited. Chlorine, bromine, and iodine are preferable, and iodine is more preferable. Among the compounds containing a halogen atom, metal compounds containing a halogen are particularly preferable. The form, the shape, and the size of the grain of these compounds are not particularly limited, and any form shape, and size can be used. For example, a solution in an alcoholic solvent, such as ethanol, can be used.

The amount of the alcohol is selected generally in the range of 2 to 100 mol, preferably in the range of 5 to 50 mol, per 1 mol of magnesium metal. When the amount of the alcohol exceeds the above range, there is the tendency that a magnesium compound having an advantageous morphology is not obtained. When the amount of the alcohol is less than the above range, there is the possibility that the reaction with magnesium metal does not proceed :smoothly.

The halogen or the compound containing a halogen is generally used in such an amount that the halogen atom is contained in the range of 0.0001 g atom or more, preferably in the range of 0.0005 g atom or more, more preferably in the range of 0.001 g atom or more, per 1 g atom of magnesium metal. When the amount of the halogen atom is less than 0.0001 g atom, the use of the magnesium compound without pulverization causes inferior supporting amount, activity, and stereoregularity and morphology of the produced polymer, and the treatment of the magnesium compound by pulverization is indispensable. Therefore, such an amount is not preferable. It is possible that the grain size of the obtained magnesium compound is controlled to a desired value by suitably selecting the amount of the halogen or the compound containing halogen.

The reaction of magnesium metal, an alcohol, and a halogen or a compound containing a halogen can be conducted in accordance with a conventional process. For example, in a conventional process, magnesium metal, an alcohol, and a halogen or a compound containing a halogen are brought into reaction with each other under the refluxing condition until generation of hydrogen is not observed any more, generally for about 20 to 30 hours, to obtain the desired magnesium compound. More specifically, when iodine is used as the halogen, for example, magnesium metal and solid iodine are thrown into an alcohol, and the mixture is refluxed by heating. In another process, an alcohol solution of iodine is added dropwise to the alcohol containing magnesium metal, and then the alcohol solution is refluxed by heating. In still another process, an alcohol solution of iodine is added dropwise into an alcohol solution containing magnesium metal with heating. In any of these processes, it is preferable that the reaction is conducted in an atmosphere of an inert gas, such as nitrogen gas and argon gas, and where desired, in an inert organic solvent, such as a saturated hydrocarbon such as n-hexane. As for the addition of magnesium metal, an alcohol, and a halogen or a compound containing a halogen, it is not necessary that the entire amount of these materials are placed in the reactor at the beginning of the reaction, and these materials can be added in separate portions. It is particularly preferable that the entire amount of an alcohol is placed into the reactor at the beginning of the reaction, and magnesium metal is added to the reactor in several separate portions.

The above process is very preferable from the standpoint of safety because formation of a large amount of hydrogen gas in a short time can be prevented. Decrease in the size of the reactor is also possible. Moreover, removal of the alcohol and the halogen or the compound containing a halogen accompanied with droplets of the reaction solution formed by generation of a large amount of hydrogen gas in a short time can be prevented. The number of the separate addition can be decided in accordance with the scale of the reactor, and it is generally preferable that the number of the addition is 5 to 10 when more complicated operations caused by an increased number of the addition is considered. Of course, any of a batch process and a continuous process can be used. A process, in which a small portion of magnesium metal is added to the entire amount of an alcohol, the product formed by the reaction is separated and removed into another tank, another small portion of magnesium metal is added to the remaining reaction mixture, and these procedures are repeated, may be adopted as a modified process.

Before the magnesium compound thus obtained is used for the preparation of the solid catalyst component, the magnesium compound may be dried or washed with an inert solvent, such as n-heptane, after filtration. In any cases, the obtained magnesium compound can be used in the next step without pulverization or classification for adjustment of distribution of the grain size.

Examples of the titanium compound include tetraalkoxytitaniums, such as itetramethoxytitanium, tetraethoxytitanium, tetra-n-propoxytitanium, tetraisopropoxytitanium, tetra-n-butoxytitanium, tetraisobutoxytitanium, tetracyclohexyloxytitanium, and tetraphenoxytitanium; titanium tetrahalides, such as titanium tetrachloride, titanium tetrabromide, and titanium tetraiodide; monoalkoxytitanium trihalides, such as methoxytitanium trichloride, ethoxytitanium trichloride, propopxytitanium trichloride, n-butoxytitanium trichloride, and ethoxytitanium tribromide; dialkoxytitanium dihalides, such as dimethoxytitanium dichloride, diethoxytitanium dichloride, dipropoxytitanium dichloride, di-n-butoxytitanium dichloride, and diethoxytitanium dibromide; and trialkoxytitanium monohalides, such as trimethoxytitanium chloride, triethoxytitanium chloride, tripropoxytitanium chloride, and tri-n-butoxytitanium chloride. Among these titanium compounds, titanium compounds containing a larger number of a halogen are preferable, and titanium tetrachloride is more preferable. The titanium compound can be used singly or as a combination of two or more types.

As the electron donor, compounds shown later as examples of the electron donating compounds of component (d) can be used.

The preparation of the solid catalyst component of component (i) can be conducted in accordance with conventional processes described in the specifications of Japanese Patent Application Laid-Open No. Showa 53(1978)43094, Japanese Patent Application Laid-Open No. Showa 55(1980)-135102, Japanese Patent Application Laid-Open No. Showa 55(1980)-135103, Japanese Patent Application Laid-Open No. Showa 56(1981)-18606, Japanese Patent Application Laid-Open No. Showa 56(1981)-166205, Japanese Patent Application Laid-Open No. Showa 57(1982)-63309, Japanese Patent Application Laid-Open No. Showa 57(1982)-190004, Japanese Patent Application Laid-Open No. Showa 57(1982)-300407, and Japanese Patent Application Laid-Open No. Showa 58(1983)47003.

The solid catalyst component of component (i) thus prepared generally has the following composition: the ratio by atom of magnesium to titanium, in the range of 2 to 100; the ratio by atom of the halogen to titanium, in the range of 5 to 100; and the ratio by mol of the electron donor to titanium, in the range of 0.1 to 10.

Examples of the crystalline polyolefin of component (ii) which is optionally used in the preparation of the solid component of component (a) include crystalline polyolefins obtained from α-olefins having 2 to 10 carbon atoms, such as polyethylene, polypropylene, polybutene, and poly-4-methyl-1-pentene. The crystalline polyolefin can be obtained in accordance with (1) a process in which an olefin is preliminarily polymerized in the presence of a combination of the solid catalyst component of component (i) described above, an organoaluminum compound, and the optionally used electron donating compound (a process of preliminary polymerization), (2) a process in which the solid catalyst component of component (i) described above and an organoaluminum compound and the electron donating compound (having a melting point of 100° C. or higher) which are used optionally are dispersed in crystalline powder, such as crystalline polyethylene and polypropylene, having a uniform particle size (a dispersion process), or (3) a combined process of process (1) and process (2) described above.

In the process of the process of preliminary polymerization of process (1), the ratio by atom of aluminum to titanium is generally selected in the range of 0.1 to 100, preferably in the range of 0.5 to 50, and the ratio by mol of the electron donating compound to titanium is generally selected in the range of 0 to 50, preferably in the range of 0.1 to 20.

The relative amounts of the solid catalyst component of component (i) to the crystalline polyolefin of component (ii) in the solid component of component (a) are selected so that the ratio by weight of component (i) to component (ii) is generally in the range of 0.33 to 200, preferably 0.10 to 50.

Examples of the organoaluminum compound used as component (b) include compounds represented by general formula (I):

$$AlR^3_p X_{3-p} \tag{II}$$

wherein $R^3$ represents an alkyl group having 3 to 20 carbon atoms or an aryl group having 6 to 20 carbon atoms, X represents a halogen atom, and p represents a number of 1 to 3. Preferable examples of the organoaluminum compound include trialkylaluminums, such as triisopropylaluminum, triisobutylaluminum, and trioctylaluminum; and dialkylaluminum monohalides, such as diethylaluminum monochloride, diisopropylaluminum monochloride, diisobutylaluminum monochloride, and dioctylaluminum monochloride, and alkylaluminum sesquihalides, such as ethylaluminum sesquichloride. The organoaluminum compound can be used singly or as a combination of two or more types.

The catalyst system used in the present invention comprises, as component (c), an aromatic compound containing alkoxy groups which is represented by general formula (I):

wherein $R^1$ represents an alkyl group having 1 to 20 carbon atoms, $R^2$ represents a hydrocarbon group having 1 to 10 carbon atoms, hydroxyl group, or nitro group, m represents an integer of 1 to 6, and n represents an integer of 0 to (6-m).

Specific examples of the aromatic compound containing alkoxy groups include monoalkoxy compounds, such as m-methoxytoluene, o-methoxyphenol, m-methoxyphenol, 2-methoxy-4-methylphenol, vinylanisole, p-(1-propenyl)anisole p-allylanisole, 1,3-bis(p-methoxy-phenyl)-1-pentene, 5-allyl-2-methoxyphenol, 4-hydroxy-3-methoxybenzyl alcohol, methoxybenzyl alcohol, nitroanisole, and nitrophenetole; dialkoxy compounds, such as o-dimethoxybenzene m-dimethoxybenzene, p-dimethoxybenzene, 3,4-dimethoxytoluene, 2,6-dimethoxyphenol, and 1-allyl-3,4-dimethoxybenzene; and trialkoxy compounds, such as 1,3,5-trimethoxybenzene, 5-allyl-1,2,3-trimethoxybenzene, 5-allyl-1,2,4-trimethoxybenzene, 1,2,3-trimethoxy-5-(1-propenyl)benzene, 1,2,4-trimethoxy-5-(1-propenyl)benzene, 1,2,3-trimethoxybenzene, and 1,2,4-trimethoxybenzene. Among these compounds, dialkoxy compounds and trialkoxy compounds are preferable. The aromatic compound containing alkoxy groups can be used singly or as a combination of two or more types.

An electron donating compound is used as component (d) in the catalyst, where necessary. The electron donating compound is a compound containing oxygen, nitrogen, phosphorus, sulfur, or silicon and essentially a compound having the ability to increase the regularity in the polymerization of propylene.

Examples of the electron donating compound include organosilicon compounds, esters, thioesters, amines, ketones, nitrites, phosphines, ethers, thioethers, acid anhydrides, acid halides, acid amides, aldehydes, organic acids, and azo compounds.

Specific examples of the electron donating compound include organosilicon compounds, such as diphenyldimethoxysilane, diphenyldiethoxysilane, dibenzyldimethoxysilane, tetramethoxysilane, tetraethoxysilane, tetraphenoxysilane, methyltrimethoxysilane, methyltriethoxysilane, methyltriphenoxysilane, phenyltrimethoxysilane, phenyltriethoxysilane, benzyltrimethoxysilane, and cyclohexylmethyldimethoxysilane; esters of aromatic dicarboxylic acid, such as monomethyl phthalate, monoethyl phthalate, monopropyl phthalate, monobutyl phthalate, monoisobutyl phthalate, monoamyl phthalate, monoisoamyl phthalate, monomethyl terephthalate, monoethyl terephthalate, monopropyl terephthalate, monobutyl terephthalate, monoisobutyl terephthalate, dimethyl phthalate, diethyl phthalate, dipropyl phthalate, dibutyl phthalate, diisobutyl phthalate, diamyl phthalate, diisoamyl phthalate, methyl ethyl phthalate, methyl isobutyl phthalate, methyl propyl phthalate, ethyl butyl phthalate, ethyl isobutyl phthalate, ethyl propyl phthalate, propyl isobutyl phthalate, dimethyl terephthalate, diethyl terephthalate, dipropyl terephthalate, diisobutyl terephthalate, methyl ethyl terephthalate, methyl isobutyl terephthalate, methyl propyl terephthalate, ethyl butyl terephthalate, ethyl isobutyl terephthalate, ethyl propyl terephthalate, propyl isobutyl terephthalate, dimethyl isophthalate, diethyl isophthalate, dipropyl isophthalate, diisobutyl isophthalate, methyl ethyl isophthalate, methyl isobutyl isophthalate, methyl ethyl isophthalate, methyl isobutyl isophthalate, methyl propyl isophthalate, ethyl butyl isophthalate, ethyl isobutyl isophthalate, ethyl propyl isophthalate, and propyl isobutyl isophthalate; monoesters, such as methyl formate, ethyl formate, methyl acetate, ethyl acetate, vinyl acetate, propyl acetate, octyl acetate, cyclohexyl acetate, ethyl propionate, methyl butyrate, ethyl butyrate, ethyl valerate, methyl chloroacetate, ethyl dichloroacetate, methyl methacrylate, ethyl crotonate, ethyl pivalate, dimethyl maleate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, methyl toluate, ethyl toluate, amyl toluate, ethyl ethylbenzoate, methyl anisate, ethyl anisate, ethyl ethoxybenzoate, ethyl p-butoxybenzoate, ethyl o-chlorobenzoate, and ethyl naphthoate; esters, such as γ-butyrolactone, δ-valerolactone, coumarine, phthalide, and ethylene carbonate; organic acids, such as benzoic acid and p-oxybenzoic acid; acid anhydrides, such as succinic anhydride, benzoic anhydride, and p-toluic anhydride; ketones, such as acetone, methyl ethyl ketone, methyl isobutyl ketone, acetophenone, benzophenone, and benzoquinone; aldehydes, such as acetaldehyde, propionaldehyde, octylaldehyde, tolualdehyde, benzaldehyde, and naphthylaldehyde; acid halides, such as acetyl chloride, acetyl bromide, propionyl chloride, butyryl chloride, isobutyryl chloride, 2-methylpropionyl chloride, valeryl chloride, isovaleryl chloride, hexanoyl chloride, methylhexanoyl chloride, 2-ethylhexanoyl chloride, octanoyl chloride, decanoyl chloride, undecanoyl chloride, hexadecanoyl chloride, octadecanoyl chloride, benzylcarbonyl chloride, cyclohexanecarbonyl chloride, malonyl dichloride, succinyl dichloride, pentanedioleyl dichloride, hexanedioleyl dichloride, cyclohexanedicarbonyl dichloride, benzoyl chloride, benzoyl bromide, methylbenzoyl chloride, phthaloyl chloride, isophthaloyl chloride, terephthaloyl chloride, and benzene-1,2,4-tricarbonyl trichloride; ethers, such as methyl ether, ethyl ether, isopropyl ether, n-butyl ether, isopropyl methyl ether, isopropyl ethyl ether, t-butyl ethyl ether, t-butyl n-propyl ether, t-butyl n-butyl ether, t-amyl methyl ether, t-amyl ethyl ether, amyl ether, tetrahydrofuran, anisole, diphenyl ether, and ethylene glycol butyl ether; acid amides, such as acetamide, benzamide, and toluamide; amines, such as tributylamine, N,N'-dimethylpiperadine, tribenzylamine, aniline, pyridine, pyrroline, and tetramethylethylenediamine; nitrites, such as acetonitrile, benzonitrile, and tolunitrile; and azo compound s having sterically hindered groups bonded to the azo linkage, such ads 2,2'-azobis(2-methylpropane), 2,2'-azobis(2-ethylpropane), and 2,2'-azobis(2-methylpentane).

Among these compounds, organosilicon compounds, esters, ketones, ethers, thioethers, acid anhydrides, and acid halides are preferable. More preferable examples include organosilicon compounds, such as diphenyldimethoxysilane, phenyltriethoxysilane, and cyclohexylmethyldimethoxysilane; and diesters of aromatic dicarboxylic acids, such as di-n-butyl phthalate and diisobutyl phthalate; alkyl esters of aromatic monocarboxylic acids, such as benzoic acid, p-methoxybenzoic acid, p-ethoxybenzoic acid, and toluic acid. The electron donating compound can be used singly or as a combination of two or more types.

As for the amounts of the components used in the catalyst, the solid component of component (a) is generally used in such an amount that the amount of titanium atom is in the range of 0.0005 to 1 mol per 1 liter of the reaction volume. The organoaluminum compound of component (b) is used in such an amount that the ratio by atom of aluminum to titanium is generally 1 to 3,000, preferably 40 to 800. When this amount is outside the above range, there is the possibility that the catalyst activity is insufficient. The aromatic compound containing alkoxy groups of component (c) is used in such an amount that the ratio by mol of the compound containing alkoxy groups to titanium atom in the solid component of component (a) is generally 0.01 to 500, preferably 1 to 300. When this ratio is less than 0.01, there is the possibility that physical properties of the formed polymer are inferior. When this ratio exceeds 500, there is the possibility that the catalyst activity is insufficient.

In the present invention, the polypropylene resin of component (A) and component (A') can be produced by homopolymerization of propylene or copolymerization of propylene with small amounts of other olefins in the presence of the above catalyst, for example, in accordance with a single stage polymerization.

The process of the polymerization is not particularly limited, and the slurry polymerization process, the gas phase polymerization process, the bulk polymerization process, the solution polymerization process, or the suspension polymerization process can be used.

When the polymerization is conducted in accordance with the gas phase polymerization process, the polymerization pressure is suitably selected generally in the range of 10 to 45 kg/cm$^2$, preferably in the range of 20 to 30 kg/cm$^2$, and the polymerization temperature is suitably selected generally in the range of 40 to 90° C., preferably in the range of 60 to 75° C. The molecular weight of the polymer can be controlled in accordance with a conventional method, such as control of the concentration of hydrogen in the polymerization reactor. The molecular weight of the polymer can also be adjusted by producing a (co)polymer having a relatively high molecular weight in the polymerization stage, followed by melt kneading the obtained (co)polymer in the presence of an organic peroxide. The polymerization time is suitably selected in the range of about 5 minutes to 10 hours.

To carry out the polymerization, the components constituting the catalyst system, i.e., components (a) to (d), are mixed together in the specified relative amounts to bring the components in contact with each other. Immediately after the catalyst components are mixed together, the monomer may be introduced, and the polymerization is allowed to start. Alternatively, the catalyst system may be aged for about 0.2 to 3 hours after the catalyst components are mixed together, and subsequently the monomer is introduced. The catalyst components may be supplied in the form of a suspension in an inert solvent or the olefin used as the material monomer.

The polymer obtained after the polymerization can be treated in accordance with a conventional method. In the gas polymerization process, a stream of nitrogen gas may be passed through powder of the polymer discharged from the polymerization reactor after the polymerization to remove unreacted monomer. Alternatively, the polymer discharged from the polymerization reactor may be pelletized using an extruder, where desired. A small amount of water or alcohol may be added to completely deactivate the catalyst. In the bulk polymerization process, the polymer, discharged from the polymerization reactor may be pelletized after the unreacted monomer has been removed completely.

The polypropylene resin of component (A) and component (A') thus obtained has properties more advantageous than those of conventional polyolefin thermoplastic elastomers. The present polymer has more excellent resistance to whitening, transparency, and surface hardness. The present polymer shows more excellent workability in vacuum molding, for example, tighter attachment of a film or a sheet to a substrate in the vacuum molding. Moreover, a surface layer can be formed using a film or a sheet having a single layer.

The polypropylene resin of component (A) and component (A') can be used singly or as a mixture with thermoplastic elastomer copolymers as shown in the following.

In the decorative film or sheet of the present invention, the above polypropylene resin of component (A) or a resin mixture comprising the polypropylene resin of component (A) and a thermoplastic elastomer of component (B) may be used for the film or the sheet of a surface layer or a surface layer and a substrate.

In the decorative building material of the present invention, the above polypropylene resin of component (A') or a resin mixture comprising the polypropylene resin of component (A') and a thermoplastic elastomer of component (B) may be used for the film or the sheet of a surface layer.

The thermoplastic elastomer used as component (B) is a copolymer which shows the properties required for a thermoplastic resin, i.e., plasticity and fluidity, at a temperature of molding and rubbery properties at an ambient temperature before or after the molding.

Examples of the thermoplastic elastomer include elastomers of copolymers of styrene and a diene; hydrogenation products of these copolymers; elastomers of copolymers of ethylene and an α-olefin having 3 or more carbon atoms; elastomers of copolymers of ethylene, α-olefin having 3 or more carbon atoms, and a polyene; hydrogenation products of these copolymers; elastomers of copolymers of ethylene, an unsaturated carboxylic acid, and an ester of an α,β-unsaturated carboxylic acid; and elastomers of copolymers of acrylonitrile.

Examples of the copolymer of styrene and a diene include block copolymers of aromatic vinyl compounds, such as styrene, α-methylstyrene, and vinyltoluene, and conjugated dienes, such as butadiene and isoprene. As the aromatic vinyl compound, styrene is particularly preferable. The block copolymer may be a single block copolymer, a tereblock copolymer, a radial tereblock copolymer, or a multi-block copolymer.

The amount of the aromatic vinyl compound in the copolymer of styrene and a diene is preferably in the range of 10 to 50% by weight. When the amount is less than 10% by weight, moldability of the obtained resin mixture tends to be inferior. When the amount exceeds 50% by weight, impact resistance at a low temperature tends to be inferior.

When the units of a conjugated diene in the above block copolymer are hydrogenated, heat resistance can be improved by the increased amount of unsaturation in the main chain. Copolymers having the blocks of styrene-ethylene-butylene-styrene are particularly preferable.

Examples of the above copolymer of ethylene and α-olefins having 3 or more carbon atoms include copolymers of ethylene with propylene, butene-1, hexene-1, or octene-1. The copolymer may be {i} a copolymer obtained in accordance with a two-stage copolymerization in the presence of component (A) or component (A'), or {ii} a copolymer obtained by copolymerization in the absence of component (A) or component (A'). In the case of copolymer {i}, the copolymer contains about 10 to 80% by weight of the unit. of ethylene. A copolymer of ethylene and propylene containing 20 to 70% by weight of the unit of ethylene is a typical example. In the case of copolymer (ii), the copolymer contains generally about 20 to 90% by weight, preferably 30 to 85% by weight, of the unit of ethylene.

In the elastomer of a copolymer of ethylene, α-olefin having 3 or more carbon atoms, and a polyene, for example, one or more compounds selected from propylene, butene-1, hexene-1, heptene-1, octene-1, nonene-1, decene-1, undecene-1, and dodecene-1 is used as the α-olefin having 3 or more carbon atoms. As the polyene, one or more compounds selected from conjugated dienes, such as butadiene, isoprene, and piperylene; non-conjugated dienes, such as 1,4-hexadiene, 1,6-octadiene, 2-methyl-1,5-hexadiene, 6-methyl-1,5-heptadiene, 7-methyl-1,6-octadiene, cyclohexadiene, dicylcopentadiene, methyltetrahydroindene, 5-ethylidene-2-norbornene, 5-methylene-2-norbornene, 5-isopropylidene-2-norbornene, and 6-chloromethyl-5-isopropenyl-2-norbornene; and trienes, such as 2,3-diisopropylidene-5-norbornene, 2-ethylidene-3-isopropylidene-5-norbornene, 2-propenyl-2, 2-norbornene, 1,3,7-octatriene, and 1,4,9-decatriene can be used. Among these compounds, diene compounds, such as conjugated dienes and non-conjugated dienes, are preferable. To effectively exhibit the properties as an elastomer, it is preferable that the c6ntent of the polyene in the copolymer is adjusted so that the copolymer has an iodine value of 30 or less, more preferably in the range of 5 to 25. The copolymer may be hydrogenated to adjust the iodine value within the above range.

In the elastomer of a copolymer of ethylene, an unsaturated carboxylic acid, and ester of an α,β-unsaturated carboxylic acid, examples of the α,β-unsaturated carboxylic acid include acrylic acid, methacrylic acid, ethacrylic acid, maleic acid, fumaric acid, itaconic acid, crotonic acid, isocrotonic acid, citraconic acid, sorbic acid, mesaconic acid, and angelic acid. These compound can be used singly or as a combination of two or more types.

Examples of the ester of the α,β-ethylenically unsaturated carboxylic acid include esters of α,β-ethylenically unsaturated carboxylic acids preferably having 3 to 8 carbon atoms, such as acrylic acid, methacrylic acid, ethacrylic acid, maleic acid, fumaric acid, itaconic acid, crotonic acid, and isocrotonic acid, and monohydric alcohols, such as methyl alcohol, ethyl alcohol, isopropyl alcohol, and n-propyl alcohol, dihydric alcohols, such as ethylene glycol and propylene glycol, or polyhydric alcohols, such as glycerol and pentaerythritol. The ester can be used singly or as a combination of two or more types.

As the above copolymers, copolymers containing derivatives of the above unsaturated carboxylic acids, such as acid anhydrides, amides, imides, and metal salts, can also be used, where desired.

It is preferable that the above copolymer contains 50 to 95% by weight of the unit of ethylene, 1 to 10% by weight of the unit of the unsaturated carboxylic acid, and 4 to 49% by weight of the unit of the ester of the α,β-ethylenically unsaturated carboxylic acid in random sequences and exhibits the properties as an elastomer.

When the content of the unit of ethylene exceeds 95% by weight or the content of the unit of the ester of the α,β-ethylenically unsaturated carboxylic acid is less than 4% by we ight, there is the possibility that the properties as an elastomer are not sufficiently exhibited. When the content of the unit of ethylene is less than 50% by weight or the content of the unit of the ester of the α,β-ethyienically unsaturated carboxylic acid exceeds 49% by weight, impact resistance at a low temperature tends to become inferior. When the content of the unit of the unsaturated carboxylic acid is less than 1% by weight, the crosslinking property is inferior. When the content of the unit of the unsaturated carboxylic acid exceeds 10% by weight, the properties as an elastomer are not sufficient.

Examples of the elastomer of a copolymer of acrylonitrile include copolymers of unsaturated nitriles, such as acrylonitril and methacrylonitrile, and dienes having a chain structure, such as 1,3-butadiene and 1,3-hexadiene; ternary copolymers of acrylonitrile, 1,3-butadiene, and maleic anhydride; and copolymers obtained by hydrogenation of the diene portion of the above copolymers to a high degree to convert the double bonds into saturated bonds.

The properties of the thermoplastic elastomer copolymer related to the present invention are not particularly limited. It is preferable that the copolymer has a Mooney viscosity of about 10 to 80 at 100° C., an elongation at break of 500% or more, and a glass transition temperature of −20° C. or lower because the copolYmer contributes to softening of the material without decreasing heat resistance of the polypropylene resin of component (A) and component (A').

Among the above thermoplastic elastomer copolymers, elastomers of copolymers of ethylene and an α-olefin having 3 or more carbon atoms, elastomers of copolymers of ethylene, an α-olefin having 3 or more carbon atoms, and a diene, elastomers of copolymers of styrene and a diene, and hydrogenation products of the elastomers of copolymers of styrene and a diene are preferable from the standpoint of flexibility, moldability, and heat resistance. The thermoplastic elastomer copolymer can be used singly or as a combination of two or more types.

In the resin mixture of component (A) and component (B) in the decorative film or sheet of the present invention or the resin mixture of component (A') and component (B) in the decorative building material of the present invention, it is preferable that the content of the polypropylene resin of component (A) or component (A') is 60% by weight or more, and the content of the thermoplastic elastomer copolymer of component (B) is 40% by weight or less. It is more preferable that the content of the polypropylene resin of component (A) or component (A') is 99 to 60% by weight, and the content of the thermoplastic elastomer copolymer of component (B) is 1 to 40% by weight or less. When the content of the thermoplastic elastomer copolymer exceeds 40% by weight, transparency becomes inferior, and flexibility is exhibited excessively.

In the decorative film or sheet of the present invention, the film or the sheet comprising the polypropylene resin of component (A) or the resin mixture comprising the polypropylene resin of component (A) and the thermoplastic elastomer copolymer of component (B) is used for a surface layer or a surface layer and a substrate. When the film or the sheet is used for molding, where desired, process oils, other thermoplastic resins, modified polyolefins, various stabilizers, inorganic or organic fillers, antistatic agents, chlorine scavengers, antiblocking agents, anticlouding agents, organic flame retardants, auxiliary flame retardants, auxiliary agents for working, blooming suppressors, and waxes may be added to the polypropylene resin or the resin mixture within the range that the object of the present invention is not adversely affected.

As the process oil, softeners used in processing of synthetic rubber can be used without modification. Particularly in processing of the resin mixture, movement of molecules of the thermoplastic elastomer copolymer during mixing of the two components is facilitated by using the process oil, and generation of heat by internal friction during the mixing decreases. Moreover, workability during molding, flexibility of the molded product, tensile strength, and friction resistance of component (A) and the resin mixture are improved by using the process oil.

As the process oil, any mineral oil or synthetic oil can be used. Specific examples of the mineral oil include distillates obtained by atmospheric distillation of paraffinic crude oils, intermediate crude oils and naphthenic crude oils, refined oils as a fraction obtained by vacuum distillation of a residual oil obtained in the atmospheric distillation, and deeply dewaxed oils. Examples of the synthetic oil include alkylbenzenes, polybutene, and poly(α-olefin).

The properties of the process oil used in the present invention are not particularly limited. Particularly in mixing of the two components of the resin mixture, process oils preferably having a kinematic viscosity of 10 to 1000 cSt, more preferably 20 to 700 cSt, are used.

Examples of the other thermoplastic resin described above include low density polyethylene produced by the high pressure process, high density polyethylene, other types of polypropylene, polybutene, polyvinyl chloride, polystyrene, and polyamide. Examples of the other thermoplastic resin also include linear copolymers of ethylene and an α-olefin which are not used as the thermoplastic elastomer copolymer in the resin mixture, such as copolymers of ethylene and butene-1, copolymers of ethylene and hexene-1, copolymers of ethylene and octene-1, acrylic resins, ABS resins, polyesters, and polycarbonates.

Among these resins, polyolefin resins, such as various types of polyethylene, other types of polypropylene, and polybutene, are preferable from the standpoint of compatibility, and polyethylene and copolymers of ethylene and α-olefins are more preferable.

Examples of the modified polyolefin include polymers obtained by chemical modification of polyolefins, such as polyethylene, polypropylene, copolymers of ethylene and α-olefins, copolymers of ethylene, α-olefins, and conjugated diene compounds such as EPDM, and rubbers of copolymers of ethylene, aromatic monovinyl compounds, and conjugated diene compounds, with unsaturated carboxylic acids, such as acrylic acid, methacrylic acid, and maleic acid, anhydrides of unsaturated carboxylic acids, such as maleic anhydride, esters of unsaturated carboxylic acids, such as methyl acrylate and monomethyl maleate, amides of unsaturated carboxylic acids, such as acrylamide and maleic acid monoamide, or imides of unsaturated carboxylic acids, such as maleimide and N-butylmaleimide.

For the chemical modification, for example, the polyolefin is reacted with the above unsaturated carboxylic acid or a derivative thereof using a radical generator such as benzoyl peroxide in a suitable solvent.

As the above stabilizer, stabilizers to prevent oxidation and heat degradation are generally used. For example, phenolic stabilizers, organic phosphite stabilizers, thioether stabilizers, and hindered amine stabilizers can be used.

As the phenolic stabilizers, conventional phenolic stabilizers can be used. Examples of the phenolic stabilizer include 2,6-di-t-butyl-4-methylphenol, 2,6-di-t-butyl-4-ethylphenol, 2,6-dicyclohexyl-4-methylphenol, 2,6-diisopropyl-4-ethylphenol, 2,6-di-t-amyl-4-methylphenol, 2,6-di-t-octyl-4-n-propylphenol, 2,6-dicyclohexyl-4-n-octylphenol, 2-isopropyl-4-methyl-6-t-butylphenol, 2-t-butyl-2-ethyl-6-t-octylphenol, 2-isobutyl-4-ethyl-5-t-hexylphenol, 2-cyclohexyl-4-n-butyl-6-isopropylphenol, mixed cresols modified with styrene, dl-α-tocopherol, t-butylhydroquinone, 2,2'-methylenebis(4-methyl-6-t-butylphenol), 4,4'-butylidenebis(3-methyl-6-t-butylphenol), 4,4'-thiobis(3-methyl-6-t-butylphenol), 2,2'-thiobis(4-methyl-6-t-butylphenol), 4,4'-methylenebis(2,6-di-t-butylphenol), 2,2'-methylenebis[6-(1-methylcyclohexyl)-p-cresol], 2,2'-ethylidenebis(4,6-di-t-butylphenol), 2,2'-butylidenebis(2-t-butyl-4-methylphenol), 1,1,2tris(2-methyl-4-hydroxy-5-t-butylphenyl)butane, triethylene glycol-bis[3-(3-t-butyl-5-methyl-4-hydroxyphenyl)propionate], 1,6-hexanediol-bis[3-(3,5-di-t-butyl-4-hydroxyphenyl)propionate], 2,2'-thiodiethylenebis[3-(3,5-di-t-butyl-4-hydroxyphenyl)propionate], N,N'-hexamethylenebis(3,5-di-t-butyl-4-hydroxyhydrocinnamide), 3,5-di-t-butyl-4-hydroxybenzyl phosphonate diethyl ester, 1,3,5-tris(2,6-dimethyl-3-hydroxy-4-t-butylbenzyl)isocyanurate, 1,3,5-tris[(3,5-di-t-butyl-4-hydroxyphenyl)propionyloxyethyl]isocyanurate, tris(4-t-butyl-2,6-dimethyl-3-hydroxybenzyl)isocyanurate, 2,4-bis(n-octylthio)-6-(4-hydroxy-3,5-di-t-butylanilino)-1,3,5-triazine, tetrakis[methylene-3-(3,5-di-t-butyl-4-hydroxyphenyl)propionate]methane, bis(3,5-di-t-butyl-4-hydroxybenzyl ethyl phosphonate)calcium, bis(1,3,5-di-t-butyl-4-hydroxybenzyl ethyl phosphonate) nickel, bis[3,3-bis(3-t-butyl-4-hydroxyphenyl)butyric acid]glycol ester, N,N'-bis[3-(3,5-di-t-butyl-4-hydroxyphenyl)propionyl] hydrazine, 2,2'-oxamidobis[ethyl-3-(3,5-di-t-butyl-4-hydroxyphenyl)propionate], bis[2-t-butyl-4-methyl-6-(3-t-butyl-5-methyl-2-hydroxybenzyl)phenyl]terephthalate, 1,3,5-trimethyl-2,4,6-tris(3,5-di-t-butyl-4-hydroxyphenyl)benzene, 3,9-bis[1,1-dimethyl-2-[β-(3,t-butyl-4-hydroxy-5-methylphenyl)propionyloxy]ethyl-2,4,8,10-tetraoxaspiro[5,5]undecane, 2,2-bis[4-[2-(3,5-di-t-butyl-4-hydroxyhydrocinnamoyloxy)]ethoxyphenyl]propane, stearyl-β-(4-hydroxy-3,5-di-t-butylphenol)propionate, and other β-(3,5-di-t-butyl-4-hydroxyphenyl)propionic acid alkyl esters. Among these compounds, 2,6-di-t-butyl-4-methylphenol, stearyl-β-(4-hydroxy-3,5-di-t-butylphenol) propionate, 2,2'-ethylidenebis(4,6-di-t-butylphenol), and tetrakis[methylene-3-(3,5-di-t-butyl-4-hydroxyphenyl) propionate]methane are preferable.

Examples of the organic phosphite stabilizer include trioctyl phosphite, trilauryl phosphite, tristridecyl phosphite, trisisodecyl phosphite, phenyl diisooctyl phosphite, phenyl di(tridecyl)phosphite, diphenyl isooctyl phosphite, diphenyl isodecyl phosphite, diphenyl tridecyl phosphite, triphenyl phosphite, tris(nonylphenyl)phosphite, tris(2,4-di-t-butylphenyl)phosphite, tris(butoxyethyl)phosphite, tetratridecyl 4,4'-butylidenebis(3-methyl-6-t-butylphenol) diphoshpite, 4,4'-isopropylidenediphenol alkyl phosphite containing an alkyl group having about 12 to 15 carbon atoms, 4,4'-isopropylidenebis(2,4-t-butylphenol)di(nonylphenyl)phosphite, tris(biphenyl)phosphite, tetra (tridecyl) 1,1,3-tris(2-methyl-5-t-butyl-4-hydroxyphenyl) butane diphosphite, tris(3,5-di-t-butyl-4-hydroxyphenyl) phosphite, hydrogenated 4,4'-isopropylidenediphenol polyphosphite, bis(octylphenyl)bis[4,4'-butylidenebis(3-methyl-6-t-butylphenol)]1,6-hexanediol diphosphite, hexatridecyl 1,1,3-tris(2-methyl-4-hydroxy-5-t-butylphenol)diphosphite, tris[4,4'-isopropylidenebis(2-t-butylphenol)]phosphite, tris(1,3-distearoyloxyisopropyl) phosphite, 9,10-dihydro-9-phosphaphenanthrene-10-oxide, tetrakis(2,4-di-t-butylphenyl)-4,4'-biphenylene diphosphonite, distearyl pentaerythritol diphosphite, di(nonylphenyl)pentaerythritol diphosphite, phenyl 4,4'-isopropylidenediphenol pentaerythritol diphosphite, bis(2,4-di-t-butylphenyl)pentaerythritol diphosphite, bis(2,6-di-t-butyl-4-methylphenyl)pentaerythritol diphosphite, and phenyl bisphenol A pentaerythritol diphosphite.

Among these compounds, tris(2,4-di-t-butylphenyl) phosphite, tris(nonylphenyl)phosphite, and tetrakis(2,4-di-t-butylphenyl) 4,4'-biphenylene diphosphite are preferable, and tris(2,4-di-t-butylphenyl)phosphite is more preferable.

As the organic thioether stabilizer, dialkyl thiodipropionates and polyhydric alcohol esters of alkylthiopropionic acids are preferably used. As the above dialkyl thiodipropionate, dialkyl thiodipropionates containing alkyl groups having 6 to 20 carbon atoms are preferable. As the above polyhydric alcohol esters of alkylthiopropionic acids, polyhydric alcohol esters of alkylthiopropionic acids containing an alkyl group having 4 to 20 carbon atoms are preferable. Examples of the polyhydric alcohol constituting the polyhydric alcohol ester include glycerol, trimethylolethane, trimethylolpropane, pentaerythritol, and trishydroxyethyl isocyanurate.

Examples of the dialkyl thiodipropionate include dilauryl thiodipropionate, dimyristyl thiodipropionate, and distearyl thiodipropionate. Examples of the polyhydric alcohol ester of an alkylthiopropionic acid include glycerol tributylthiopropionate, glycerol trioctylthiopropionate, glycerol trilaurylthiopropionate, glycerol tristearylthiopropionate, trimethylolethane tributylthiopropionate, trimethylolethane trioctylthiopropionate, trimethylolethane trilaurylthiopropionate, trimethylolethane tristearylthiopropionate, pentaerythritol tetrabutylthiopropionate, pentaerythritol tetraoctylthiopropionate, pentaerythritol tetralaurylthiopropionate, and pentaerythritol tetrastearylthiopropionate. Among these compounds, dilauryl thiodipropionate, distearyl thiodipropionate, and pentaerythritol tetralaurylthiopropionate are preferable.

Examples of the hindered amine stabilizer include bis(2,2,6,6-tetramethyl-4-piperidyl)sebacate, polycondensation products of dimethyl succinate and 1-(2-hydroxyethyl)-4-hydroxy-2,2,6,6-tetramethylpiperidine, poly[6-(1,1,3,3-tetramethylbutyl)imino-1,3,5-triazine-2,4-diyl][(2,2,6,6,-tetramethyl-4-piperidyl)imino]hexamethylene[2,2,6,6,-tetramethyl-4-piperidyl)imino], tetrakis(2,2,6,6-tetramethyl-4-piperidyl) 1,2,3,4-butanetetracarboxylate, 2,2,6,6-tetramethyl-4-piperidyl benzoate, bis(1,2,6,6-tetramethyl-4-piperidyl) 2-(3,5-di-t-butyl-4-hydroxybenzyl)-2-n-butylmalonate, bis(N-methyl-2,2,6,6,-tetramethyl-4-piperidyl)sebacate, 1,1'-(1,2-ethanediyl)bis(3,3,5,5-tetramethylpiperadinone), (mixed 2,2,6,6-tetramethyl-4-piperidyl/tridecyl) 1,2,3,4-butanetetracarboxylate, (mixed 1,2,2,6,6-pentamethyl-4-piperidyl/tridecyl) 1,2,3,4-butanetetracarboxylate, mixed [2,2,6,6-tetramethyl-4-piperidyl/β,β,β',β'-tetramethyl-3,9-[2,4,8,10-tetraoxaspiro(5,5)undecane]diethyl]1,2,3,4-butanetetracarboxylate, mixed [1,2,2,6,6-pentamethyl 4-piperidyl/β,β,β',β'-tetramethyl-3,9-[2,4,8, 10-tetraoxaspiro(5,5)undecane] diethyl 1,2,3,4-butanetetracarboxylate, condensation products of N,N'-bis(3-aminopropyl)-ethylenediamine and 2,4-bis[N-butyl-N-(1,2,2,6,6-pentamethyl-4-piperidyl)amino]-6-chloro-1,3,5-triazine, poly[6-N-morpholyl-1,3,5-triazine-2,4-diyl][2,2,6,6-tetramethyl-4-piperidyl)imino]hexamethylene-[(2,2,6,6-tetramethyl-4-piperidyl)imide], condensation products of N,N'-bis(2,2,6,6-tetramethyl-4-piperidyl)hexamethylenediamine and 1,2-dibromoethane, and [N-(2,2,6,6-tetramethyl-4-piperidyl)-2-methyl-2-(2,2,6,6-tetramethyl-4-piperidyl)imino]propionamide.

Among these hindered amine stabilizers, polycondensation products of dimethyl succinate and 1-(2-hydroxyethyl)-4-hydroxy-2,2,6,6-tetramethylpiperidine, poly[6-(1,1,3,3-tetramethylbutyl)imino-1,3,5-triazine-2,4-diyl][(2,2,6,6,-tetramethyl-4-piperidyl)imino]hexamethylene-[(2,2,6,6-tetramethyl-4-piperidyl)imino], tetrakis(2,2,6,6-tetramethyl-4-piperidyl) 1,2,3,4-butanetetracarboxylate, 2,2,6,6-tetramethyl-4-piperidyl benzoate, bis(1,2,6,6-pentamethyl-4-piperidyl) 2-(3,5-di-t-butyl-4-hydroxybenzyl)-2-n-butylmalonate, 1,1'-(1,2-ethanediyl)bis(3,3,5,5-tetramethylpiperadinone), (mixed 2,2,6,6-tetramethyl-4-piperidyl/tridecyl) 1,2,3,4-butanetetracarboxylate, (mixed 1,2,2,6,6-pentamethyl-4-piperidyl/tridecyl) 1,2,3,4-butanetetracarboxylate, mixed [2,2,6,6-tetramethyl-4-piperidyl/β,β,β',β'-tetramethyl-3,9-[2,4,8,10-tetraoxaspiro(5,5)undecane]diethyl] 1,2,3,4-butanetetracarboxylate, mixed [1,2,2,6,6-pentamethyl-4-piperidyl/β,β,β',β'-tetramethyl-3,9-[2,4,8,10-tetraoxaspiro(5,5)undecane]diethyl 1,2,3,4-butanetetracarboxylate, condensation products of N,N'-bis(3-aminopropyl) ethylenediamine and 2,4-bis[N-butyl-N-(1,2,2,6,6-pentamethyl-4-piperidyl)amino]-6-chloro-1,3,5-triazine, poly[6-N-morpholyl-1,3,5-triazine-2,4-diyl][2,2,6,6-tetramethyl-4-piperidyl)imino]-hexamethylene[(2,2,6,6-tetramethyl-4-piperidyl)imide], condensation products of N,N'-bis(2,2,6,6-tetramethyl-4-piperidyl)hexamethylenediamine and 1,2-dibromoethane, and [N-(2,2,6,6-tetramethyl-4-piperidyl)-2-methyl-2-(2,2,6,6-tetramethyl-4-piperidyl)imino]propionamide are preferable.

Examples of the inorganic filler include fillers having spherical shapes, fillers having plate shapes, and fillers having fiber shapes. Examples of the filler having a spherical shape include calcium carbonate, kaolin (aluminum silicate), silica, perlite, Shirasu balloon, sericite, diatomaceous earth, calcium sulfite, baked alumina, calcium silicate, crystalline zeolite, and amorphous zeolite. Examples of the filler having a plate shape include talc and mica. Examples of the filler having a fiber shape include fillers having needle shapes, such as wollastonite; fillers having fiber shapes, such as magnesium oxysulfate, fiber of potassium titanate, and calcium carbonate having a fiber shape; and fillers having a long fiber shape, such as glass fiber.

Examples of the organic filler include powder of wood materials, such as wood powder and cotton powder; powder of rice hulls; powder of crosslinked rubber; powder of plastics; and powder of colagen.

Examples of the fire retardant include hydrated aluminum, hydrated gypsum, zinc borate, barium borate, borax, kaolin, clay, calcium carbonate, alunite, basic magnesium carbonate, calcium hydroxide, and magnesium hydroxide. Among these fillers, fillers adversely affecting the transparency are not used in surface layers but used mainly in substrates.

In the decorative film or sheet of the present invention, for example, a film or a sheet used for a surface layer or a surface layer and a substrate is molded advantageously as follows. Various additives are optionally added to the polypropylene resin of component (A). Alternatively, the thermoplastic elastomer copolymer of component (B) and, optionally, various additives are added to the polypropylene resin of component (A). A molding material is prepared by mixing the components using a tumbler blender or a Henschel mixer; by melt kneading a mixture of the components obtained above using a single screw extruder or a twin-screw extruder, and then pelletizing the kneaded mixture; or by melt mixing the components using a kneader or a Banbury mixer, and then pelletizing the obtained mixture. The prepared molding material is formed into a film or a sheet having a thickness of 0.03 to 0.5 mm in accordance with a molding process, such as the cast molding, the inflation molding, or the calender molding.

It is preferable that the film or the sheet thus prepared has a surface treatment, such as a treatment by corona discharge, a treatment with ozone, and a treatment with plasma, to improve the property for adhesion or printing. When this film or sheet is used as a substrate, the shielding effect may be provided by addition of a pigment during the molding.

The decorative film or sheet of the present invention may be a so-called doubling film which has a laminate structure comprising a surface layer, an adhesive layer, a layer having a pattern, an adhesive layer, and a substrate, or a so-called back printed film which has a laminate structure comprising a surface layer, an adhesive layer, and a layer having a pattern but not comprising a substrate and has a pattern printed directly on a surface layer.

As the adhesive layer in the above decorative film or sheet, a layer having a thickness of 1 to 20 μm and made of, for example, a conventional adhesive material which comprises a polyurethane resin, an epoxy resin, an acrylic resin, a vinyl resin, a vinyl acetate resin, a polyester resin, an ethylene-vinyl acetate copolymer resin, an acrylic monomer-vinyl acetate copolymer resin, a polyamide resin, or an ionomer resin as the main component or a modified polyolefin is preferably used. Examples of the modified polyolefin include polymers obtained by chemical modification of polyolefins, such as polyethylene, polypropylene, copolymers of ethylene and α-olefins, copolymers of ethylene, α-olefins, and conjugated diene compounds such as EPDM, and rubbers of copolymers of ethylene, aromatic monovinyl compounds, and conjugated diene compounds, with unsaturated carboxylic acids, such as acrylic acid, methacrylic acid, and maleic acid, anhydrides of unsaturated carboxylic acids, such as maleic anhydride, esters of unsaturated carboxylic acids, such as methyl acrylate and monomethyl maleate, amides of unsaturated carboxylic acids, such as acrylamide and maleic acid monoamide, or imides of unsaturated carboxylic acids, such as maleimide and N-butylmalemide.

The form of the adhesive material used in the working is not particularly limited, and an adhesive of a liquid, an intermediate melt, a film, or a sheet can be used. When two adhesive layers are formed, the two adhesive layers may be composed of the same material or different materials.

On the layer having a pattern, a pattern, such as a wood pattern, a stone grain pattern, a surface pattern of natural leather, a cloth pattern, and an abstract pattern, is printed. A binder contained in an ink used for forming the pattern is not particularly limited, and for example, any binder suitably selected from polyurethane resins, vinyl chloride resins, vinyl chloride-vinyl acetate copolymer resins, combinations of vinyl chloride-vinyl acetate copolymer resins and acrylic resins, chlorinated polypropylene resins, acrylic resins, polyester resins, polyamide resins, butyral resins, polystyrene resins, nitrocellulose resins, and acetylcellulose resins can be used. The ink suitably comprises coloring agents such as pigments and dyestuffs, fillers, and solvents. The patterned layer generally has a thickness of about 1 to 5 $\mu$m.

It is preferable that the layer having a pattern in the decorative film or sheet of the present invention has the two-layer structure comprising a patterned layer and a shielding layer. As the ink used for forming the shielding layer, an ink prepared by suitably mixing coloring agents, such as pigments and dyes stuffs, fillers, solvents, stabilizers, plasticizers, catalysts, and curing agents with a binder is used. Examples of the binder include the same materials as those described as the examples of the binder contained in the ink used for forming the above patterned layer. The shielding layer is preferably a layer having a thickness of 1 to 20 $\mu$m and covered with a uniform color. The shielding layer is disposed under the patterned layer.

The decorative film or sheet of the present invention may comprise, where desired, a top coat layer which has a thickness of about 1 to 20 $\mu$m, is made of an acrylic resin or a polyurethane resin, and is disposed on the surface layer to improve abrasion resistance, weathering resistance, workability for embossing, scratch resistance, and fouling resistance. The surface layer may be embossed or has a wiping ink filled in concave portions. One or more layers of an adhesive resin may be formed between the surface layer and the adhesive layer, where desired. Examples of the adhesive resin used for the layer of an adhesive resin include ethylene-vinyl acetate copolymers (EVA), ethylene-methyl methacrylate copolymers (EMMA), and the polyolefins modified with unsaturated carboxylic acids or derivatives of these acids described above. In this case, it is advantageous that a multi-layer film or sheet is prepared by multi-layer extrusion of the above polypropylene resin or the above resin mixture used as the surface layer and the adhesive resin, and the prepared multi-layer film or sheet is used for producing the decorative film or sheet.

As the process for producing the decorative film or sheet of the present invention, any process can be used as along as the film or the sheet having the above laminate structure can be obtained. For example, it is advantageous that a film or a sheet having the structure comprising a surface layer, an adhesive layer, a layer having a pattern, an adhesive layer, and a substrate is produced in accordance with one of the following two processes.

In the first process, an adhesive layer, a layer having a pattern, and another adhesive layer are successively laminated together by a conventional method of printing, such as the gravure printing, the screen printing, the offset printing, and the flexo printing. Then, (1) a film or a sheet forming a surface layer is laminated with the formed adhesive layer by heat lamination; (2) a film or a sheet forming a surface layer is laminated with the formed adhesive layer by dry lamination or wet lamination; (3) a film or a sheet forming a surface layer is coated with an adhesive layer having the same composition as that of the above layers in accordance with a conventional method of printing, such as the gravure printing, the screen printing, the offset printing, and the flexo printing, and the coated film or sheet is then laminated with the adhesive layer of the above laminate by heat lamination in such a manner that the adhesive layers are attached together; or (4) a surface layer is formed on the formed adhesive layer by extrusion lamination of a resin forming the surface layer.

In the second process, an adhesive layer and a layer having a pattern are successively laminated on a substrate by a conventional method of printing, such as the gravure printing, the screen printing, the offset printing, and the flexo printing. Then, (1) an adhesive layer is formed on a film or a sheet forming a surface layer using a conventional method of printing, such as the gravure printing, the screen printing, the offset printing, and the flexo printing or a coating method, such as the roll coating, and the obtained laminate is then laminated with the laminate prepared above by heat lamination in such a manner that the adhesive layer is attached to the layer having a pattern; (2) a film or a sheet forming the surface layer is coated with an adhesive layer and then laminated with the laminate prepared above by dry lamination or wet lamination in the same manner as that conducted above in (1); (3) a resin forming an adhesive layer is extruded between the layer having a pattern and a film or a sheet forming a surface layer in a melt condition to form a laminate (extrusion lamination); or (4) the adhesive layer and the surface layer are formed simultaneously by direct lamination by coextrusion of the adhesive layer and a resin forming a surface layer.

The present invention also provides a decorative material obtained by laminating the film or the sheet thus obtained with various types of substrate.

Examples of the substrate used for the decorative material include substrates of woods, such as wood, ply wood, laminated wood, and particle boards; substrates of metals, such as steel plates, stainless steel plates, and aluminum plates; inorganic substrates, such as gypsum boards; and substrates of resins, such as flexible polypropylene and polyethylene.

To produce the decorative material, the decorative film or sheet is laminated with the substrate using an adhesive material in such a manner that the substrate and the layer having a pattern are faced to each other. The adhesive material used in this process is not particularly limited and can suitably be selected from conventional adhesive materials.

The decorative building material of the present invention generally has a structure comprising a surface layer made of the polypropylene resin of component (A) or the resin mixture comprising the polypropylene resin of component (A) and the thermoplastic elastomer copolymer of component (B) and a backing material laminated to the back face of the surface layer. The method for preparing a molded article used for the surface layer (hereinafter, referred to as a material of a surface layer) is not particularly limited and can suitably selected in accordance with the type of the decorative building material. For example, when the decorative building material has a stone grain pattern, it is advantageous that the polypropylene resin of component (A') described above or the resin mixture described above which relates to the present invention (hereinafter, referred to as the base resin of the present invention) and chips of a polyester resin such as polyethylene terephthalate or rubber are mixed together using mixing rolls, and the obtained mixture is formed into a sheet. The chips may be colored.

When the decorative building material is a material of a sliced tile type, for example, it is advantageous that the base resin of the present invention and, optionally, other flexible polypropylene resins are placed into a specific mold to prepare a plate by press molding, and the prepared plate is cut to a specific thickness. As the flexible polypropylene resin, the same resins as those described below as examples of the flexible polypropylene resin used for the backing material can be used. When the decorative building material is a material of a marble type, for example, coloring agents, such as inorganic pigments and organic pigments, are mixed with the base resin of the present invention in suitable amounts, and the prepared mixture can be formed into a plate by the injection molding or into a sheet by the cast molding. When the decorative building material is a material of a back printed type, for example, the base resin of the present invention is formed into a sheet by the cast molding, and print is made on the back face of the prepared sheet to provide a pattern.

Materials of a surface layer prepared by mixing chips of fibers, such as colored polyester fibers or cellulose fibers such as rayon fibers, with the base resin of the present invention, followed by molding the prepared mixture into a plate or materials of a surface layer having emboss or print on the surface may also be used.

The thickness of the above material of a surface layer is not particularly limited and generally selected in the range of 50 $\mu$m to 1 mm in accordance with the situation.

The backing material is not particularly limited, and paper or other materials conventionally used as the backing material of plastic decorative building materials can be used. Backing materials containing a flexible polypropylene resin as the main component are preferably used.

As the flexible polypropylene resin used for the backing material, a flexible polypropylene resin having a tensile modulus of 600 MPa or less is preferable. When the tensile modulus exceeds 600 MPa, a sheet made by using the resin is excessively firm, and there is the possibility that feel becomes inferior. When the tensile modulus is excessively small, molding a sheet becomes difficult. The tensile modulus is more preferably in the range of 400 to 300 MPa. The tensile modulus is obtained by the measurement in accordance with the tensile test of Japanese Industrial Standard K7113 using a No. 2 dumbbell of Japanese Industrial Standard.

As the flexible polypropylene resin, for example, (x) a polypropylene resin comprising one or both of a homopolymer of propylene and a copolymer of propylene containing 4% by weight or less of units of other olefins, wherein the homopolymer and the copolymer have [i] a pentad fraction expressed by rrrr/(1−mmmm)×100 of 15 to 60%, preferably 20 to 60%, more preferably 25 to 55%, as measured by $^{13}$C-NMR, [ii] a peak temperature of melting (Tm) of 150° C. or higher, preferably 150 to 165° C., as measured by DSC, and [iii] an enthalpy of melting ($\Delta$H) of 100 J/g or less, preferably 20 to 100 J/g, more preferably 30 to 70 J/g, as measured by DSC, or (y) a mixture comprising the above polypropylene resin and a random copolymer of propylene containing units of olefins other than propylene is preferable.

The above rrrr/(1−mmmm)×100, the peak temperature of melting as measured by DSC, and the enthalpy of melting ($\Delta$H) as measured by DSC are the same as those described for the polypropylene resin of component (A).

The content of the random copolymer of propylene containing units of olefins other than propylene in the above mixture of component (y) is generally 90 to 5% by weight, preferably 70 to 5% by weight. When the content exceeds 90% by weight, the properties of the flexible polypropylene resin are not sufficiently exhibited.

In the random copolymer of propylene containing units of olefins other than propylene which is used in the mixture of component (y), examples of the olefin used as the comonomer forming the unit of an olefin other than propylene include ethylene, butene-1, pentene-1, 4-methyl-1-pentene, hexene-1, heptene-1, octene-1, nonene-1, and decene-1. The above comonomer can be used singly or as a combination of two or more types. The content of the units of olefins other than propylene in the random copolymer is generally in the range of 10 to 70% by weight.

The polypropylene resin of component (x) can be produced in accordance with the same procedures as those for producing the polypropylene resin used in the surface layer. On the other hand, the mixture of component (y) can be prepared in accordance with a two stage polymerization process in which a polypropylene resin is produced in the first stage in the same manner as that described above, and the copolymerization with olefins other than propylene is conducted in the second stage. Of course, the mixture of component (y) can also be produced by separately producing the polypropylene resin and a random copolymer of propylene containing units of olefins other than propylene, followed by blending the resin and the copolymer produced.

The backing material used in the decorative building material of the present invention can be produced, for example, by preparing a resin composition comprising 4 to 45% by weight of (W) the above flexible polypropylene resin, 2 to 50% by weight of (X) an elastomer, 10 to 70% by weight of (Y) an inorganic filler containing hydroxyl group, and 0 to 40% by weight of (Z) other fillers, followed by forming the prepared resin composition into a sheet.

The above elastomer used as component (X) is not particularly limited, and various elastomers can be used. Styrene elastomers and olefin elastomers are preferable. Examples of the styrene elastomer include styrene-butadiene block copolymers (SBR), styrene-butadiene-styrene block copolymers (SBS), hydrogenated styrene-butadiene-styrene block copolymers (SEBS), styrene-isoprene block copolymers (SIR), styrene-isoprene-styrene block copolymers (SIS), and hydrogenated styrene-isoprene-styrene block copolymers (SEPS). Examples of the olefin elastomers include ethylene-propylene rubber (EPR), ethylene-propylene-diene rubber (EPDM), and ethylene-butylene rubber (EBM).

The elastomer can be used singly or as a combination of two or more types. When a styrene elastomer is used, a combined use of SEBS and other styrene elastomers is preferable.

In the resin composition, the inorganic filler containing hydroxyl group used as component (Y) is not particularly limited, and fillers containing hydroxyl group or water molecules in the molecule can be used. Examples of the inorganic filler containing hydroxyl group include aluminum hydroxide, magnesium hydroxide, potassium hydroxide, barium hydroxide, hydrated alumina, hydrated gypsum, zinc borate, barium borate, borax, alunite, and basic magnesium carbonate. Among these compounds, aluminum hydroxide and magnesium hydroxide are preferable. The filler containing hydroxyl group can be used singly or as a combination of two or more types.

It is preferable that the components are comprised in the resin composition in the following amounts: the flexible polypropylene resin of component (W), in the range of 4 to 45% by weight; the elastomer of component (X), in the range of 2 to 50% by weight; and the inorganic filler containing hydroxyl group of component (Y), in the range of 10 to 70% by weight. When the amount of component (W), (X), or (Y) is outside the above range, it is difficult to obtain a resin composition having excellent balance between resistance to blocking, resistance to slipping, and workability in molding. To obtain a resin composition having excellent balance between resistance to blocking, resistance to slipping, and workability in molding, the amount of component (W) in the range of 5 to 40% by weight, the amount of component (X) in the range of 5 to 40% by weight, and the amount of component (Y) in the range of 20 to 60% by weight are more preferable. Component (W) comprised in the resin composition exhibits an effect of increasing the range of the moldable temperature.

Where desired, this resin composition may also comprise other fillers in an amount of about 40% by weight or less as component (Z) to provide the backing material with a suitable stiffness. When the amount of component (Z) exceeds 40% by weight, the molding property becomes inferior, and there is the possibility that flexibility deteriorates. To provide the resin composition with a suitable stiffness without adversely affecting the molding property and flexibility, it is preferable that component (Z) is comprised in an amount of 30% by weight or less.

As the other filler, inorganic fillers and organic fillers other than the above inorganic filler containing hydroxyl group can be used. Examples of the inorganic filler other than the inorganic filler containing hydroxyl group include fillers having spherical shapes, fillers having plate shapes, and fillers having fiber shapes. Examples of the filler having a spherical shape include calcium carbonate, kaolin (aluminum silicate), silica, perlite, Shirasu balloon, sericite, diatomaceous earth, calcium sulfite, baked alumina, calcium silicate, crystalline zeolite, and amorphous zeolite. Examples of the filler having a plate shape include talc and mica. Examples of the filler having a fiber shape include fillers having needle shapes, such as wollastonite; fillers having fiber shapes, such as magnesium oxysulfate, fiber of potassium titanate, and calcium carbonate having a fiber shape; and fillers having a long fiber shape, such as glass fiber. Inorganic coloring agents, such as carbon black, can also be used.

Examples of the organic filler include powder of wood materials, such as wood powder and cotton powder; powder of rice hulls; powder of crosslinked rubber; powder of plastics; and powder of colagen.

Among these fillers, inorganic fillers are preferably used. The filler can be used singly or as a combination of two or more types.

The process for preparing the resin composition is not particularly limited, and a conventional process can be used. For example, the resin composition can be prepared by melt mixing the flexible polypropylene resin of component (W), the elastomer of component (X), the inorganic filler containing hydroxyl group of component (Y), and other fillers of component (Z) and, optionally, various additives using a batch mixer, such as Banbury mixer, or a kneader-extruder, such as a twin-screw kneader, a twin-screw extruder, and a single screw extruder, followed by granulating the prepared mixture, where desired. When the components are supplied into a kneader-extruder, the entire amount of the components may be blended in advance and supplied into the kneader-extruder, or the components may be supplied separately into the kneader-extruder.

The backing material can be prepared by forming thus prepared resin composition into a sheet. The process for forming the sheet is not particularly limited, and a conventional extrusion process, such as the T-die molding, can be used. However, it is preferable that the resin composition obtained after the melt kneading is directly supplied to mixing rolls, calender rolls, or rolls for forming sheets, to prepare a sheet having a prescribed thickness. The resin composition obtained by the melt kneading may be directly formed into a sheet without granulation after the extrusion. Alternatively, the resin composition may be granulated into pellets, and the prepared pellets are formed into a sheet by extrusion using various extruders.

The thickness of the thus obtained backing material is not particularly limited and, in general, suitably selected in the range of 0.1 to 50 mm in accordance with the situation.

The material of a surface layer and the backing material used in the decorative building material of the present invention may comprise, where desired, process oils, other thermoplastic resins, modified polyolefins, various stabilizers, lubricants, antistatic agents, chlorine scavengers, flame retardants, auxiliary flame retardants, antiblocking agents, auxiliary agents for working, bleeding suppressors, and coloring agents.

The material of a surface layer may also comprise inorganic or organic fillers other than the fillers described above, where desired.

Examples of the process oil, the other thermoplastic resins, the modified polyolefin, various types of the stabilizer, the inorganic fillers, the organic fillers, and the flame retardants include corresponding compounds and materials described above as the examples in the decorative film or sheet.

The decorative building material of the present invention may be prepared by laminating a surface layer and a backing material by heat sealing or by laminating a surface layer and a backing layer with an adhesive layer placed between them. When an adhesive layer is placed, a layer made of, for example, a conventional adhesive material which comprises a polyurethane resin, an epoxy resin, an acrylic resin, a vinyl resin, a vinyl acetate resin, a polyester resin, an ethylene-vinyl acetate copolymer resin, an acrylic monomer-vinyl acetate copolymer resin, a polyamide resin, or an ionomer resin as the main component or a modified polyolefin is preferably used as the adhesive layer.

In the decorative building material of the present invention, where desired, layers comprising various materials, such as sheets containing colored fibers, sheets of glass fiber, paper, and non-woven fabrics, may be formed between the surface layer and the backing material, or between the surface layer and the adhesive layer when the adhesive layer is placed, to improve the property to form a pattern or strength. A transparent protective layer may be formed on the surface layer, where desired. Examples of the protective layer include layers comprising an acrylic resin curable by ultraviolet light and foamed layers.

In accordance with the present invention, a laminated decorative film or sheet which comprises a surface layer having excellent transparency and hardness, has excellent workability in bending, V-cutting, and lapping, and does not cause problems in disposal and a decorative building material which has excellent heat resistance, weatherability, and abrasion resistance, provides soft feeling, and does not cause problems in the environment can be obtained easily.

The present invention is described more specifically with reference to examples in the following. However, the present invention is not limited by the examples.

<Production of Decorative Sheets or Films>

EXAMPLE 1

(1) Production of a Homopolymer of Propylene

{1} Preparation of a Magnesium Compound

Into a glass reactor which had an inner volume of about 6 liters, was equipped with a stirrer, and had been sufficiently purged with nitrogen gas, about 2,430 g of ethanol, 20 g of iodine, and 160 g of magnesium metal were placed. The obtained mixture was heated while being stirred to allow the reaction to proceed in the mixture under a refluxing condition until hydrogen gas was not generated any more in the reaction system, and a solid reaction product was produced. By drying the obtained reaction mixture containing the solid reaction product under a vacuum, a magnesium compound was obtained.

{2} Preparation of a Solid Catalyst Component of Component (a)

Into a glass reactor which had an inner volume of 5 liters and had been sufficiently purged with nitrogen gas, 160 g of the above magnesium compound obtained in {1} (not pulverized), 800 ml of purified heptane, 24 ml of silicon tetrachloride, and 23 ml of diethyl phthalate were placed, and the reaction system was kept at 80° C. While the reaction system was stirred, 770 ml of titanium tetrachloride was added into the system, and the reaction was allowed to proceed at 110° C. for 2 hours. Then, the solid component was separated and washed with purified heptane at 90° C. To the washed solid component, 1,220 ml of titanium tetrachloride was added, and the reaction was allowed to proceed at 110° C. for 2 hours. The solid component was washed sufficiently with purified heptane to obtain a solid catalyst component of component (a).

{3} Gas Phase Polymerization

Into a polymerization reactor having an inner volume of 200 liters, components were supplied at the following rates: the above solid catalyst component of component (a) obtained in {2}, 6.0 g/hour; triisobutylaluminum (TIBA), 0.2 mol/hour; 1-allyl-3,4-dimethoxybenzene (ADMB), 0.006 mol/hour; cyclohexylmethyldimethoxysilane (CHMDMS), 0.03 mol/hour; and propylene, 43 kg/hour. The polymerization was allowed to proceed at 70° C. and 28 kg/cm$^2$G. The rate of formation of the polymer was 30 kg/hour.

The polymer obtained by the above polymerization was a homopolymer of propylene having an intrinsic viscosity [η] (135° C., in decaline) of 5.04 dl/g.

The above homopolymer contained 88.1% by weight of a fraction insoluble in boiling n-heptane which had [η] of 5.42 dl/g and a fraction soluble in boiling n-heptane which had [η] of 2.07 dl/g.

The homopolymer had a pentad fraction expressed by rrrr/(1−mmmm)×100 of 24.2% as calculated from $^{13}$C-NMR, a peak temperature of melting (Tm) of 158.7° C. as measured by DSC, and an enthalpy of melting (ΔH) of 80.7 J/g as measured by DSC. With respect to the head-to-tail bonding of propylene, no reversed bonding was found. To powder of the obtained polypropylene, 2,5-dimethyl-2,5-di(t-butylperoxy)-hexane was mixed, and then an antioxidant, a heat stabilizer, and a chlorine scavenger were added. The obtained mixture was extruded through a 40 mmϕ extruder to obtain pellets. The obtained pellets had a melt index (MI) of 2.5 g/10 minutes.

The above polymer was decomposed with a peroxide to obtain a low molecular weight polymer. The obtained low molecular weight polymer showed no change in the pentad fraction, the peak temperature of melting, or the enthalpy of melting from those of the original polymer.

(2) Molding of a Film of a Surface Layer

The pellets of the homopolymer of propylene obtained in (1) was formed into a film having a thickness of 100 μm using a 90 mmϕ cast molding machine under the condition of a resin temperature of 250° C. and a pulling speed of 10 m/minute. At the time of molding, one face of the film was embossed, and both faces of the film were treated by corona discharge (5.0 kW). The surface treated with the corona discharge had a wetting index (obtained in accordance with the method of Japanese Industrial Standard K6768) of 50 dyne/cm.

(3) Lamination of an Adhesive Layer

An adhesive layer having a thickness of 3 μm was formed on the smooth face of the film obtained in (2) using a primer containing a vinyl chloride-vinyl acetate copolymer resin as the main component in accordance with the gravure printing.

(4) Preparation of a Printed Film (a Layer Having a Pattern)

A primer containing a vinyl chloride-vinyl acetate copolymer resin as the main component and an ink containing a vinyl chloride-vinyl acetate copolymer as the binder were successively laminated with a colored film of high density polyethylene having a thickness of 90 μm in accordance with the gravure printing. On the prepared laminate, a primer containing a vinyl chloride-vinyl acetate copolymer resin as the main component was laminated in the same manner to prepare a printed film. The total thickness of the printed film was 100 μm.

(5) Lamination of the Film of the Surface Layer and the Printed Film

The face having the adhesive layer of the above film of the surface layer obtained in (3) and the face having the adhesive layer of the above printed film obtained in (4) were placed together, and both films were laminated by passing through rolls heated to 120° C. to obtain a decorative sheet.

(6) Lamination with Boards and Evaluation of Workability in Fabrication

In the decorative film obtained above, the surface layer showed excellent transparency, and the layer having a pattern provided depth. The decorative film had the same degree of flexibility as that of decorative films made of polyvinyl chloride.

Using an adhesive material containing an ethylene-vinyl acetate copolymer resin as the main component, the above decorative film was laminated with a particle board having an intermediate density and a rough surface in such a manner that the layer of the colored film of high density polyethylene was in contact with the particle board. The decorative film was also laminated with a board having a flat surface in the same manner. Both boards prepared above were worked by V-cutting. Neither formation of cracks nor whitening was observed at the folded part, and workability in lapping and V-cutting was excellent.

EXAMPLE 2

(1) Direct Lamination by Colamination

The homopolymer of propylene obtained in Example 1 (1) and an adhesive resin prepared by mixing 20% by weight of a polyolefin modified with maleic anhydride (manufactured by IDEMITSU PETROCHEMICAL Co., Ltd., POLYTAC E-100) with 80% by weight of this homopolymer of propylene were coextruded. The obtained laminate was treated with ozone and then laminated with the printed film obtained in Example 1 (4) to obtain a decorative film. The temperature of the resin at the time of extrusion was 290° C., and the thickness of the obtained decorative film was 160 μm.

(2) Lamination with Boards and Evaluation of Workability in Fabrication

In the decorative film obtained above, the surface layer showed excellent transparency, and the layer having a pattern provided depth. The decorative film had the same degree of flexibility as that of decorative films made of polyvinyl chloride.

Using an adhesive material containing an ethylene-vinyl acetate copolymer resin as the main component, the above decorative film was laminated to a particle board having an intermediate density and a rough surface in such a manner that the layer of the colored film of high density polyethylene was in contact with the particle board. The decorative film was also laminated to a board having a flat surface in the same manner. Both boards prepared above were worked by V-cutting. Neither formation of cracks nor whitening was observed at the folded part, and workability in lapping and V-cutting was excellent.

EXAMPLE 3

(1) Preparation of a Film Printed on the Back

The film obtained in Example 1 (2) was used as the surface layer. On the smooth face of this film, an adhesive layer and a layer having a pattern were successively laminated in accordance with the gravure printing using a primer containing a vinyl chloride-vinyl acetate copolymer resin as the main component and an ink containing a vinyl chloride-vinyl acetate copolymer resin as the binder. Using a mixture of a pigment with the above ink, a uniformly colored layer was laminated with the obtained laminate in accordance with the gravure printing to prepare a decorative film.

(2) Lamination with Boards and Evaluation of Workability in Fabrication

In the decorative film obtained above, the surface layer showed excellent transparency, and the layer having a pattern provided depth. The decorative film had the same degree of flexibility as that of decorative films made of polyvinyl chloride.

Using an adhesive material containing an ethylene-vinyl acetate copolymer resin as the main component, the above decorative film was laminated to a particle board having an intermediate density and a rough surface in such a manner that the uniformly colored layer was in contact with the particle board. The decorative film was also laminated to a board having a flat surface in the same manner. Both boards prepared above were worked by V-cutting. Neither formation of cracks nor whitening was observed at the folded part, and workability in lapping and V-cutting was excellent.

Comparative Example 1

(1) Preparation of a Film of a Surface Layer

A polypropylene resin (manufactured by SUMITOMO CHEMICAL Co., Ltd.; NOBLEN FL6315G; peak temperature of melting (Tm), 140° C.) in an amount of 90% by weight and 10% by weight of a thermoplastic elastomer (manufactured by KURARAY Co., Ltd.; HYBRAR HVS-3) were dry blended, and the obtained blend was used for molding under the condition of a resin temperature of 230° C. and a pulling speed of 5 m/minute using a 40 mmϕ cast molding machine to prepare a film having a thickness of 80 μm. One face of the prepared film was embossed, and both faces were treated by corona discharge (4.5 kW). The wetting index of the surface treated by corona discharge was 49 dyne/cm.

(2) Lamination of an Adhesive Layer

An adhesive layer having a thickness of 3 μm was formed on the smooth face of the film obtained in (1) using a primer containing a vinyl chloride-vinyl acetate copolymer resin as the main component in accordance with the gravure printing.

(3) Preparation of a Printed Film (a Layer Having a Pattern)

A primer containing a vinyl chloride-vinyl acetate copolymer resin as the main component and an ink containing a vinyl chloride-vinyl acetate copolymer as the binder were successively laminated with a colored film of high density polyethylene having a thickness of 90 μm in accordance with the gravure printing. On the prepared laminate, a primer containing a vinyl chloride-vinyl acetate copolymer resin as the main component was laminated in the same manner to prepare a printed film. The total thickness of the printed film was 100 μm.

(4) Lamination of the Film of the Surface Layer and the Printed Film

The face having the adhesive layer of the above film of the surface layer obtained in (2) and the face having the adhesive layer of the above printed film obtained in (3) were placed together, and both films were laminated by passing through rolls heated to 120° C. to obtain a decorative sheet.

(6) Lamination with Boards and Evaluation of Workability in Fabrication

In the decorative film obtained above, the surface layer showed slightly inferior transparency, and the layer having a pattern provided depth. The decorative film had the same degree of flexibility as that of decorative films made of polyvinyl chloride.

Using an adhesive material containing an ethylene-vinyl acetate copolymer resin as the main component, the above decorative film was laminated to a particle board having an intermediate density and a rough surface in such a manner that the layer of the colored film of high density polyethylene was in contact with the particle board. The decorative film was also laminated to a board having a flat surface in the same manner. Both boards prepared above were worked by V-cutting. Whitening was observed at the folded part in working of lapping and V-cutting at a low temperature.

The results obtained above are shown together in Table 1.

TABLE 1

| Evaluation | Example 1 | Example 2 | Example 3 | Comparative Example 1 |
|---|---|---|---|---|
| Transparency of the surface layer | excellent | excellent | excellent | slightly inferior |
| Workability in lapping | excellent | excellent | excellent | whitening at low temperature |
| Workability in V-cutting | excellent | excellent | excellent | whitening at low temperature |

<Production of Decorative Building Materials>

Physical properties and "feel" of the obtained decorative building materials were evaluated in accordance with the following methods:

(1) Abrasion resistance (in accordance with the method of Japanese Industrial Standard K7205)

The abrasion resistance was evaluated in accordance with the Taber abrasion test using a floor material made of a polyvinyl chloride resin (Comparative Example 2) as the reference. The result was evaluated in accordance with the following criteria:

Δ: The abraded amount was the same as the abraded amount of the floor material made of a polyvinyl chloride resin.

◯: The abraded amount was less than and ½ or more of the abraded amount of the floor material made of a polyvinyl chloride resin.

◎: The abraded amount was less than ½ of the abraded amount of the floor material made of a polyvinyl chloride resin.

(2) Heat resistance (in accordance with the method of Japanese Industrial Standard K7206)

The heat resistance was evaluated from the Vicat softening point in accordance with the following criteria:

Δ: The Vicat softening point was 100° C. or lower.

◯: The Vicat softening point was higher than 100° C. and 150° C. or lower.

(3) Weatherability (in accordance with the method of Japanese Industrial Standard A1415)

The weatherability was evaluated from the appearance after about 500 hours using a WS type apparatus in accordance with the following criteria:

Δ: Crazings, cracks, and discoloration found.

◯: No change (4) Feel

"Feel" was evaluated from the feeling obtained by touching a material by hands in accordance with the following criteria:

Δ: Felt cold when touched by hands.

◯: Felt warm when touched by hands.

Preparation Example 1

Preparation of a Resin for a Surface Layer (1) Preparation of a Magnesium Compound Into a glass reactor which had an inner volume of about 6 liters, was equipped with a stirrer, and had been sufficiently purged with nitrogen gas, about 2,430 g of ethanol, 20 g of iodine, and 160 g of magnesium metal were placed. The obtained mixture was heated while being stirred to allow the reaction to proceed in the mixture under a refluxing condition until hydrogen gas was not generated any more in the reaction system, and a solid reaction product was produced. By drying the obtained reaction mixture containing the solid reaction product under a vacuum, a magnesium compound was obtained.

(2) Preparation of a Solid Catalyst Component of Component (a)

Into a glass reactor which had an inner volume of 5 liters and had been sufficiently purged with nitrogen gas, 160 g of the above magnesium compound obtained in (1) (not pulverized), 800 ml of purified heptane, 24 ml of silicon tetrachloride, and 23 ml of diethyl phthalate were placed, and the reaction system was kept at 80° C. While the reaction system was stirred, 770 ml of titanium tetrachloride was added into the system, and the reaction was allowed to proceed at 110° C. for 2 hours. Then, the solid component was separated and washed with purified heptane at 90° C. To the washed solid component, 1,220 ml of titanium tetrachloride was added, and the reaction was allowed to proceed at 110° C. for 2 hours. The solid component was washed sufficiently with purified heptane to obtain a solid catalyst component of component (a).

(3) Gas Phase Polymerization

Into a polymerization reactor having an inner volume of 200 liters, components were supplied at the following rates: the above solid catalyst component of component (a) obtained in (2), 6.0 g/hour; triisobutylaluminum (TIBA), 0.2 mol/hour; 1-allyl-3,4-dimethoxybenzene (ADMB), 0.007 mol/hour; cyclohexylmethyldimethoxysilane (CHMDMS), 0.03 mol/hour; and propylene, 40 kg/hour. The polymerization was allowed to proceed at 70° C. and 28 kg/cm$^2$G. The rate of formation of the polymer was 30 kg/hour.

The polymer obtained by the above polymerization was a homopolymer of propylene having an intrinsic viscosity [η] (135° C., in decaline) of 5.04 dl/g.

The above homopolymer contained 88.1% by weight of a fraction insoluble in boiling n-heptane which had [η] of 5.42 dl/g and a fraction soluble in boiling n-heptane which had [η] of 2.07 dl/g.

The homopolymer had a pentad fraction expressed by rrrr/(1−mmmm)×100 of 27.2% as calculated from $^{13}$C-NMR, a peak temperature of melting (Tm) of 161.7° C. as measured by DSC, and an enthalpy of melting (ΔH) of 75.5 J/g as measured by DSC. With respect to the head-to-tail bonding of propylene, no reversed bonding was found. To powder of the obtained polypropylene, 2,5-dimethyl-2,5-di (t-butylperoxy)-hexane was mixed, and then an antioxidant, a heat stabilizer, and a chlorine scavenger were added. The obtained mixture was extruded through a 40 mmφ extruder to obtain pellets. The obtained pellets had a melt index (MI) of 2.5 g/10 minutes.

The above polymer was decomposed with a peroxide to obtain a low molecular weight polymer. The obtained low molecular weight polymer showed no change in the pentad fraction, the peak temperature of melting, or the enthalpy of melting from those of the original polymer.

Preparation Example 2

(1) Preparation of a Magnesium Compound

Into a glass reactor which had an inner volume of about 6 liters, was equipped with a stirrer, and had been sufficiently purged with nitrogen gas, about 2,430 g of ethanol, 16 g of iodine, and 160 g of magnesium metal were placed. The obtained mixture was heated while being stirred to allow the reaction to proceed in the mixture under a refluxing condition until hydrogen gas was not generated any more in the reaction system, and a solid reaction product was produced. By drying the obtained reaction mixture containing the solid reaction product under a vacuum, a magnesium compound was obtained.

{2} Preparation of a Solid Catalyst Component of Component (a)

Into a glass reactor which had an inner volume of 5 liters and had been sufficiently purged with nitrogen gas, 160 g of the above magnesium compound obtained in (1) (not pulverized), 800 ml of purified heptane, 24 ml of silicon tetrachloride, and 23 ml of diethyl phthalate were placed, and the reaction system was kept at 80° C. While the reaction system was stirred, 770 ml of titanium tetrachloride was added into the system, and the reaction was allowed to proceed at 110° C. for 2 hours. Then, the solid component was separated and washed with purified heptane at 90° C. To the washed solid component, 1,220 ml of titanium tetrachloride was added, and the reaction was allowed to proceed at 110° C. for 2 hours. The solid component was washed sufficiently with purified heptane to obtain a solid catalyst component of component (a).

(3) Gas Phase Polymerization

Into a polymerization reactor having an inner volume of 200 liters, components were supplied at the following rates: the above solid catalyst component of component (a) obtained in (2), 6.0 g/hour; triisobutylaluminum (TIBA), 0.2 mol/hour; 1-allyl-3,4-dimethoxybenzene (ADMB), 0.012 mol/hour; diphenyldimethoxysilane (DPDMS), 0.005 mol/hour; and propylene, 37 kg/hour. The first stage polymerization was allowed to proceed at 70° C. and 28 kg/cm$^2$G. The rate of formation of the polymer was 30 kg/hour.

The polymer obtained by the first stage polymerization was continuously transferred to a polymerization reactor of the second stage. The polymerization was allowed to proceed at 50° C. and 15 kg/cm2G while ethylene was supplied at 15 kg/hour and propylene was supplied at 5 kg/hour, and a polymer powder containing 16.5% by weight of the ethylene unit was obtained with a conversion of 40% in the second stage.

The polymer obtained by the above first stage polymerization was a homopolymer of propylene having an intrinsic viscosity [η] (135° C., in decaline) of 4.27 dl/g.

The above homopolymer contained 60.0% by weight of a fraction insoluble in boiling n-heptane which had [η] of 4.76 dl/g and a fraction soluble in boiling n-heptane which had [η] of 2.65 dl/g.

The homopolymer had a pentad fraction expressed by rrrr/(1−mmmm)×100 of 34.5% as calculated from $^{13}$C-NMR, a peak temperature of melting (Tm) of 158° C. as measured by DSC, and an enthalpy of melting (ΔH) of 54J/g as measured by DSC. With respect to the head-to-tail bonding of propylene, no reversed bonding was found.

The polymer obtained by the second stage polymerization is described in the following. This polymer was a flexible polypropylene resin comprising the homopolymer of propylene and a random copolymer of ethylene and propylene.

The polymer obtained by the two-stage polymerization had an intrinsic viscosity [η] of 4.77 dl/g. To powder of the obtained polymer, 2,5-dimethyl-2,5-di(t-butylperoxy)-hexane was mixed, and then an antioxidant, a heat stabilizer, and a chlorine scavenger were added. The obtained mixture was extruded through a 40 mmφ extruder to obtain pellets. The obtained pellets had a melt index (MI) of 2.0 g/10 minutes.

The above polymer was decomposed with a peroxide to obtain a low molecular weight polymer. The obtained low molecular weight polymer showed no change in the pentad fraction, the peak temperature of melting, or the enthalpy of melting from those of the original polymer.

This polymer had a tensile modulus of 230 MPa.

EXAMPLE 4
A Decorative Building Material Having a Stone Grain Pattern
(1) Preparation of a Material of a Surface Layer The pellets of the homopolymer of propylene obtained in Preparation Example 1 in an amount of 90% by weight and 10% by weight of chips of polyethylene terephthalate were mixed together using mixing rolls at a roll temperature of 170° C. for 5 minutes, and a sheet having a thickness of 200 μm was prepared.
(2) Preparation of a Backing Material A mixture containing 20% by weight of the flexible polypropylene resin obtained in Preparation Example 2, 18% by weight of SBR (manufactured by ASAHI CHEMICAL INDUSTRY Co., Ltd.; trade name, TUFDEN 2003), 2% by weight of SEBS (manufactured by ASAHI CHEMICAL INDUSTRY Co., Ltd.; trade name, TUFTEC H-1051), 45% by weight of aluminum hydroxide (manufactured by SHOWA DENKO K.K.; trade name, HISILITE H-21), and 15% by weight of calcium carbonate was kneaded at a set temperature of 120° C. for 5 minutes using a Banbury mixer, and a sheet having a thickness of 3 mm was prepared by using mixing rolls while the thickness is adjusted by the rolls.

(3) Preparation of a Laminated Sheet

A laminated sheet was prepared by laminating the sheets obtained in (1) and (2) using a press molding machine at a set temperature of 200° C. to obtain a decorative building material having a stone grain pattern.

Physical properties and feel of the obtained material are shown in Table 2.

EXAMPLE 5
A Decorative Building Material of a Sliced Tile Type
(1) Preparation of a Material of a Surface Layer The homopolymer of propylene obtained in Preparation Example 1 was placed into a specific mold and formed by press molding at a set temperature of 200° C. to obtain a plate having a thickness of 50 mm. By cutting the obtained plate, a sheet having a thickness of 200 Am was prepared.
(2) Preparation of a Backing Material A sheet having a thickness of 2 mm was prepared in accordance with the same procedures as those conducted in Example 4 (2).
(3) Preparation of a Laminated Sheet A laminated sheet was prepared by laminating the sheets obtained in (1) and (2) using a press molding machine at a set temperature of 180° C. to obtain a decorative building material of a sliced tile style.

Physical properties and feel of the obtained material are shown in Table 2.

EXAMPLE 6
A Decorative Building Material Having a Marble Pattern
(1) Preparation of a Material of a Surface Layer The homopolymer of propylene obtained in Preparation Example 1 in an amount of 90% by weight and 10% by weight of a pigment (a mixture of an organic pigment and an inorganic pigment) were placed into a hopper, and the obtained mixture was formed by injection molding at a set temperature of 220° C. to prepare a sheet having a thickness of 1 mm.
(2) Preparation of a Backing Material A sheet having a thickness of 3 mm was prepared in accordance with the same procedures as those conducted in Example 4 (2).
(3) Preparation of a Laminated Sheet A laminated sheet was prepared by laminating the sheets obtained in (1) and (2) using a press molding machine at a set temperature of 180° C. to obtain a decorative building material having a marble pattern.

Physical properties and feel of the obtained material are shown in Table 2.

EXAMPLE 7
A Decorative Building Material of a Back Printed Type
(1) Preparation of a Material of a Surface Layer Pellets of the homopolymer of propylene obtained in Preparation Example 1 was formed to a sheet having a thickness of 200 μm in accordance with the cast molding, and a pattern was formed on one face of the obtained sheet by printing.
(2) Preparation of a Backing Material A sheet having a thickness of 3 mm was prepared in accordance with the same procedures as those conducted in Example 4 (2).
(3) Preparation of a Laminated Sheet A laminated sheet was prepared by laminating the sheets obtained in (1) and (2) using a press molding machine at a set temperature of 180° C. to obtain a decorative building material of a back printed type.

In the above material, the two sheets were laminated together in such a manner that the sheet obtained in (2) was attached to the printed face of the sheet obtained in (1). The lamination could be conducted more easily when an adhesive or a primer was used.

Physical properties and feel of the obtained material are shown in Table 2.

EXAMPLE 8
A decorative Building Material of a Back Printed Type

A decorative building material of a back printed type was prepared in accordance with the same procedures as those conducted in Example 7 except that a mixture of 90% by weight of the homopolymer of propylene obtained in Preparation Example 1 and 10% by weight of a hydrogenated SBR (manufactured by JSR Co., Ltd.; trade name, DYNARON 1320P) was used in place of the pellets of the homopolymer of propylene used in Example 7 (1). Physical properties and feel of the material are shown in Table 2.

Comparative Example 2
A Floor Material Made of Polyvinyl Chloride
(1) Preparation of a Material of a Surface Layer A polyvinyl chloride resin (degree of polymerization, 700) in an amount of 100 parts by weight and 40 parts by weight of dioctyl phthalate as the plasticizer were kneaded together using mixing rolls, and a sheet having a thickness of 200 μm was prepared. A pattern was formed on one face of the obtained sheet by printing.

(2) Preparation of a Backing Material

A sheet having a thickness of 3 mm was prepared in accordance with the same procedures as those conducted in Example 4 (2).

(3) Preparation of a Laminated Sheet

A laminated sheet was prepared by laminating the sheets obtained in (1) and (2) using a press molding machine at a set temperature of 180° C. to obtain a floor material made of a polyvinyl chloride resin.

In the above material, the two sheets were laminated together in such a manner that the sheet obtained in (2) was attached to the printed face of the sheet obtained in (1).

Physical properties and feel of the obtained material are shown in Table 2.

TABLE 2

|  | abrasion resistance | heat resistance | weather-ability | feel |
|---|---|---|---|---|
| Example 4 | ○ | ○ | ○ | ○ |
| Example 5 | ○ | ○ | ○ | ○ |
| Example 6 | ○ | ○ | ○ | ○ |
| Example 7 | ⊚ | ○ | ○ | ○ |
| Example 8 | ○ | ○ | ○ | ○ |
| Comparative Example 2 | Δ | Δ | Δ | Δ |

The homopolymer of propylene which was obtained in Preparation Example 1 (PP of Prep.Ex.1) and used as the material of the surface layer in the decorative building material of the present invention was superior to conventional polypropylenes as shown in the following. Films having a thickness of 100 μm were prepared for the comparison. As the conventional polypropylene, a homopolymer of propylene (homoPP), a block copolymer of propylene (blockPP), and a random copolymer of propylene (randomPP) were used.

(1) Superior to homoPP with respect to flexibility
  tensile modulus (MPa):
    homoPP=about 1000
    PP of Prep.EX.1=500

(2) Superior to blockPP with respect to transparency
  haze (%):
    blockPP=about 40
    PP of Prep.Ex.1=about 7

(3) Superior to randomPP with respect to heat resistance
  melting point measured by DSC (° C.): randomPP=about 120° C.

INDUSTRIAL APPLICABILITY

The decorative film or sheet of the present invention has a surface layer showing excellent transparency and hardness, shows excellent workability in V-cutting, lapping, and vacuum molding, and does not cause problems in disposal because chlorine gas is not formed by incineration. Thus, the film or the sheet is valuable as a commercial product.

The decorative film or sheet of the present invention can be advantageously used, for example, for materials of furniture, cabinets of refrigerators and televisions, and interior materials of buildings because of the above advantageous properties.

The decorative building material of the present invention shows excellent heat resistance, weatherability, and abrasion resistance and has a property for printing and a workability in fabrication (workability in V-cutting and vacuum molding) as excellent as those of building materials made of polyvinyl chloride resins. The decorative building material of the present invention provides soft feeling and does not cause problems in environment. Therefore, this material is advantageously used for floor materials and decorative wall materials.

What is claimed is:

1. A decorative film or sheet having a laminate structure comprising a surface layer, an adhesive layer, and a layer having a pattern, wherein the surface layer is made of a film or a sheet comprising a resin which comprises (A) 100 to 60% by weight of a polypropylene resin comprising one or both of a homopolymer of propylene and a copolymer of propylene containing 4% by weight or less of units of other olefins, the homopolymer and the copolymer having (i) a pentad fraction expressed by rrrr/(1−mmmm)×100 of 15 to 60% as measured by a nuclear magnetic resonance spectrum of an isotopic carbon ($^{13}$C-NMR), (ii) a peak temperature of melting (Tm) of 150° C. or higher as measured by a differential scanning calorimeter (DSC), and (iii) an enthalpy of melting (ΔH) of 100 J/g or less as measured by DSC, and (B) 0 to 40% by weight of a thermoplastic elastomer copolymer.

2. A decorative film or sheet according to claim 1, wherein the homopolymer and the copolymer have (i) a pentad fraction expressed by rrrr/(1−mmmm)×100 of 15 to 50% as measured by a nuclear magnetic resonance spectrum of an isotopic carbon ($^{13}$C-NMR).

3. A decorative film or sheet according to claim 1, wherein the homopolymer and the copolymer have [iii] an enthalpy of melting (ΔH) of 10 to 100 J/g.

4. A decorative film or sheet according to claim 1, wherein the resin contains a thermoplastic elastomer copolymer which is at least one copolymer selected from the group consisting of elastomers of copolymers of ethylene and α-olefins having 3 or more carbon atoms, elastomers of copolymers of ethylene, α-olefins having 3 or more carbon atoms, and dienes, elastomers of copolymers of styrene and dienes, and elastomers of hydrogenated copolymers of styrene and dienes.

5. A decorative film or sheet according to claim 1, wherein the layer having a pattern has a two-layer structure comprising a patterned layer and a shielding layer.

6. A decorative material comprising the decorative film or sheet described in claim 1 which is bonded to a substrate selected from the group consisting of wood substrates, metal substrates, inorganic substrates, and resin substrates.

7. A method of making a decorative film or sheet, the method comprising laminating a surface layer, an adhesive layer, and a layer having a pattern; and producing the decorative film or sheet having a laminate structure of claim 1.

8. A decorative film or sheet having a laminate structure comprising a surface layer, an adhesive layer, a layer having a pattern, an adhesive layer, and a substrate, wherein the surface layer or the surface layer and the substrate are made of a film or a sheet comprising a resin which comprises (A) 100 to 60% by weight of a polypropylene resin comprising one or both of a homopolymer of propylene and a copolymer of propylene containing 4% by weight or less of units of other olefins, the homopolymer and the copolymer having (i) a pentad fraction expressed by $rrrr/(1-mmmm) \times 100$ of 15 to 60% as measured by a nuclear magnetic resonance spectrum of an isotopic carbon ($^{13}$C-NMR), (ii) a peak temperature of melting (Tm) of 150° C. or higher as measured by a differential scanning calorimeter (DSC), and (iii) an enthalpy of melting ($\Delta$H) of 100 J/g or less as measured by DSC, and (B) 0 to 40% by weight of a thermoplastic elastomer copolymer.

9. A decorative film or sheet according to claim 8, wherein the homopolymer and the copolymer have (i) a pentad fraction expressed by $rrrr/(1-mmmm) \times 100$ of 15 to 50% as measured by a nuclear magnetic resonance spectrum of an isotopic carbon ($^{13}$C-NMR).

10. A decorative film or sheet according to claim 8, wherein the homopolymer and the copolymer have [iii] an enthalpy of melting ($\Delta$H) of 10 to 100 J/g.

11. A decorative film or sheet according to claim 8, wherein the resin contains a thermoplastic and the copolymer which is at least one copolymer selected from the group consisting of elastomers of copolymers of ethylene and $\alpha$-olefins having 3 or more carbon atoms, elastomers of copolymers of ethylene, $\alpha$-olefins having 3 or more carbon atoms, and dienes, elastomers of copolymers of styrene and dienes, and elastomers of hydrogenated copolymers of styrene and dienes.

12. A decorative film or sheet according to claim 8, wherein the layer having a pattern has a two-layer structure comprising a patterned layer and a shielding layer.

13. A decorative material comprising the decorative film or sheet described in claim 8, which is bonded to a substrate selected from the group consisting of wood substrates, metal substrates, inorganic substrates, and resin substrates.

14. A method of making a decorative film or sheet, the method comprising
    laminating a surface layer, an adhesive layer, a layer having a pattern, an adhesive layer, and a substrate layer; and
    producing the decorative film or sheet having a laminate structure of claim 8.

15. A decorative building material having a surface layer comprising a resin which comprises (A) 100 to 60% by weight of a polypropylene resin comprising one or both of a homopolymer of propylene and a copolymer of propylene containing 4% by weight or less of units of other olefins, the homopolymer and the copolymer having (i) a pentad fraction expressed by $rrrr/(1-mmmm) \times 100$ of 15 to 60% as measured by a nuclear magnetic resonance spectrum of an isotopic carbon ($^{13}$C-NMR), (ii) a peak temperature of melting (Tm) of 150° C. or higher as measured by a differential scanning calorimeter (DSC), and (iii) an enthalpy of melting ($\Delta$H) of 100 J/g or less as measured by DSC and (B) 0 to 40% by weight of a thermoplastic elastomer copolymer.

16. A decorative building material according to claim 15, wherein the homopolymer and the copolymer have (i) a pentad fraction expressed by $rrrr/(1-mmmm) \times 100$ of 15 to 50% as measured by a nuclear magnetic resonance spectrum of an isotopic carbon ($^{13}$C-NMR).

17. A decorative building material according to claim 15, wherein the homopolymer and the copolymer have (iii) an enthalpy of melting $\Delta$H of 10 to 100 J/g.

18. A decorative building material according to claim 15, wherein the resin contains a thermoplastic elastomer copolymer is at least one copolymer selected from the group consisting of elastomers of copolymers of ethylene and $\alpha$-olefins having 3 or more carbon atoms, elastomers of copolymers of ethylene, $\alpha$-olefins having 3 or more carbon atoms, and dienes, elastomers of copolymers of styrene and dienes, and elastomers of hydrogenated copolymers of styrene and dienes.

19. A decorative building material according to claim 15, wherein the surface layer is a sheet having print at least on one face, a sheet containing chips of at least one material selected from the group consisting of synthetic resins and rubbers, or a sheet containing a coloring agent.

20. A decorative building material according to claim 15, wherein an adhesive layer is disposed between the surface layer and the backing material.

21. A method of making a decorative building material, the method comprising
    laminating a surface layer and a backing material; and
    producing the decorative building material of claim 15.

22. A decorative building material according to claim 15, wherein the flexible polypropylene resin has a tensile modulus of 600 Mpa or less.

23. A decorative building material according to claim 15, wherein the flexible polypropylene resin has a tensile modulus in the range of 300 to 400 Mpa.

24. A decorative building material according to claim 15, wherein the flexible polypropylene resin comprises one or both of a homopolymer of propylene and a copolymer of propylene containing 4% by weight or less of units of other olefins.

25. A decorative building material according to claim 15, wherein the flexible polypropylene resin comprises one or both of a homopolymer of propylene and a copolymer of propylene containing 4% by weight or less of units of other olefins,
    and wherein the homopolymer and the copolymer in the flexible polypropylene resin have:
    (i) a pentad fraction expressed by $rrrr/(1-mmmm) \times 100$ of 15 to 60% as measured by a nuclear magnetic resonance spectrum of an isotropic carbon $^{13}$C-NMR, (ii) a peak temperature of melting Tm of 150° C. or higher as measured by a differential scanning calorimeter DSC, and (iii) an enthalpy of melting ΔH of 100 J/g or less as measured by DSC.

26. A decorative building material according to claim 15, wherein the flexible polypropylene comprises a mixture of (a) and (b):

(a) a random copolymer of propylene containing olefin units other than propylene; and (b) a polypropylene resin comprising one or both of a homopolymer of propylene and a copolymer of propylene containing 4% by weight or less of units of other olefins, wherein said homopolymer and copolymer in (b) resin have:

(i) a pentad fraction expressed by rrrr/(1−mmmm)×100 of 15 to 60% as measured by a nuclear magnetic resonance spectrum of an isotropic carbon $^{13}$C-NMR, (ii) a peak temperature of melting Tm of 150° C. or higher as measured by a differential scanning calorimeter DSC, and (iii) an enthalpy of melting ΔH of 100 J/g or less as measured by DSC.

* * * * *